United States Patent
Fujii et al.

(10) Patent No.: US 8,309,696 B2
(45) Date of Patent: Nov. 13, 2012

(54) AZO PIGMENT, ELECTROPHOTOGRAPHIC PHOTOSENSITIVE MEMBER, PROCESS CARTRIDGE, AND ELECTROPHOTOGRAPHIC APPARATUS

(75) Inventors: Atsushi Fujii, Yokohama (JP); Mai Murakami, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 12/550,561

(22) Filed: Aug. 31, 2009

(65) Prior Publication Data

US 2010/0075239 A1 Mar. 25, 2010

(30) Foreign Application Priority Data

Sep. 25, 2008 (JP) ................... 2008-246337

(51) Int. Cl.
C09B 35/14 (2006.01)
C09B 35/34 (2006.01)
C09B 35/023 (2006.01)
C09B 35/233 (2006.01)
C07C 29/08 (2006.01)
G03G 15/04 (2006.01)
G03G 21/18 (2006.01)
G03G 5/043 (2006.01)

(52) U.S. Cl. ........ 534/566; 534/654; 534/657; 534/666; 534/669; 534/689; 534/691; 534/752; 534/755; 534/759; 534/797; 534/821; 399/111; 399/159; 430/56; 430/64; 430/72; 430/77

(58) Field of Classification Search .............. None
See application file for complete search history.

(56) References Cited

U.S. PATENT DOCUMENTS 5,981,124 A 11/1999 Shimada et al.
6,040,100 A * 3/2000 Tanaka et al. ................ 430/72
7,276,318 B2 * 10/2007 Fujii et al. ................. 430/59.4
7,517,626 B2 * 4/2009 Fujii et al. ................... 430/72

FOREIGN PATENT DOCUMENTS

| EP | 0 940 725 A1 | 9/1999 |
| EP | 1 542 081 A1 | 6/2005 |
| JP | 08-087124 | 4/1996 |
| JP | 8-87124 A | 4/1996 |
| JP | 09-048757 | 2/1997 |
| JP | 9-48757 A | 2/1997 |

OTHER PUBLICATIONS

Search Report dated May 12, 2011 in European Application No. 09171227.3.
Chinese Office Action dated Mar. 29, 2012 in Chinese Application No. 200910176064.6.

* cited by examiner

*Primary Examiner* — Fiona T Powers
(74) *Attorney, Agent, or Firm* — Fitzpatrick, Cella, Harper & Scinto

(57) ABSTRACT

The present invention provides an azo pigment comprising a group represented by the general formula (1) below, an electrophotographic photosensitive member comprising an intermediate layer comprising the azo pigment, and a process cartridge and an electrophotographic apparatus that comprise the electrophotographic photosensitive member.

General formula (1)

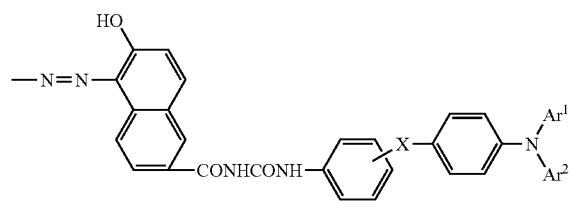

11 Claims, 2 Drawing Sheets

AZO PIGMENT, ELECTROPHOTOGRAPHIC PHOTOSENSITIVE MEMBER, PROCESS CARTRIDGE, AND ELECTROPHOTOGRAPHIC APPARATUS

BACKGROUND OF THE INVENTION

1. Field of the Invention

The present invention relates to a novel azo pigment, an electrophotographic photosensitive member comprising the azo pigment, and a process cartridge and an electrophotographic apparatus that comprise the electrophotographic photosensitive member.

2. Description of the Related Art

As electrophotographic photosensitive members, electrophotographic photosensitive members (organic photosensitive members) which have good film formability and which can be produced by coating that use organic photoconductive materials (charge generation materials and charge transport materials) have recently been widely used.

Advantages of organic photosensitive members include very high productivity and low-cost production as well as free control of sensitivity and the like according to the selection of the photoconductive material used, so the organic photosensitive members have been extensively studied.

In addition, to improve the sensitivity and durability of electrophotographic photosensitive members, organic photosensitive members have more recently developed that have a laminated (functionally separated) photosensitive layer comprising a charge generation layer containing a charge generation material and a charge transport layer containing a charge transport material that are laminated together.

Among various charge generation materials, azo pigments have excellent photoconductivity and allow for easy production of compounds having various properties by a combination of an amine component (central skeleton) and a coupler component, so many compounds have been disclosed (Japanese Patent Application Laid-Open No. H09-048757 and Japanese Patent Application Laid-Open No. H08-087124).

However, electrophotographic photosensitive members containing these azo pigments only in the charge generation layer do not necessarily have performance that can sufficiently deal with potential variation. Moreover, with the recent tendency toward higher speed, higher image quality, and full coloring, electrophotographic photosensitive members have been more seriously requested to deal with potential variation. Especially, the initial (up to 1,000 rotations) potential variation (increase in light-area potential) and the long-term (up to 50,000 rotations) potential variation (increase in light-area potential) in a low-humidity environment are expected to be prevented.

SUMMARY OF THE INVENTION

An object of the present invention is to provide a novel azo pigment to obtain an electrophotographic photosensitive member having a small potential variation and to provide an electrophotographic photosensitive member having a small potential variation.

In addition, another object of the present invention is to provide a process cartridge and an electrophotographic apparatus comprising an electrophotographic photosensitive member having a small potential variation.

The present invention is an azo pigment having a group represented by the following general formula (1):

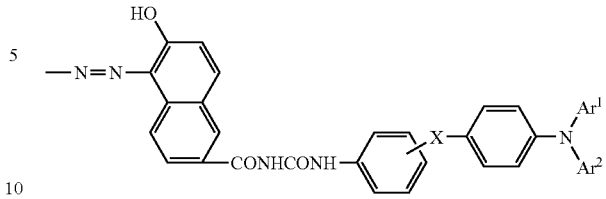

General formula (1)

(wherein, $Ar^1$ and $Ar^2$ each independently represent a substituted or unsubstituted aryl group; and X represents —$CH_2$—, —$CH_2$—$CH_2$—, —$CH_2$—$CH_2$—$CH_2$— or —CH=CH—).

Further, the present invention is an electrophotographic photosensitive member having a support, an intermediate layer provided on the support and a photosensitive layer provided on the intermediate layer, wherein the intermediate layer comprises the azo pigment above.

Furthermore, the present invention is a process cartridge that integrally supports the electrophotographic photosensitive member above and at least one device of the group consisting of a charging device, a developing device, a transfer device and a cleaning device and that can be detachably attached to the main body of an electrophotographic apparatus.

Moreover, the present invention is an electrophotographic apparatus comprising the electrophotographic photosensitive member above, a charging device, an exposure device, a developing device and a transfer device.

According to the present invention, a novel azo pigment to obtain an electrophotographic photosensitive member having a small potential variation can be provided and an electrophotographic photosensitive member having a small potential variation can be provided.

In addition, according to the present invention, a process cartridge and an electrophotographic apparatus that comprise an electrophotographic photosensitive member having a small potential variation can be provided.

Further features of the present invention will become apparent from the following description of exemplary embodiments with reference to the attached drawings.

DESCRIPTION OF THE EMBODIMENTS

Figure 1:
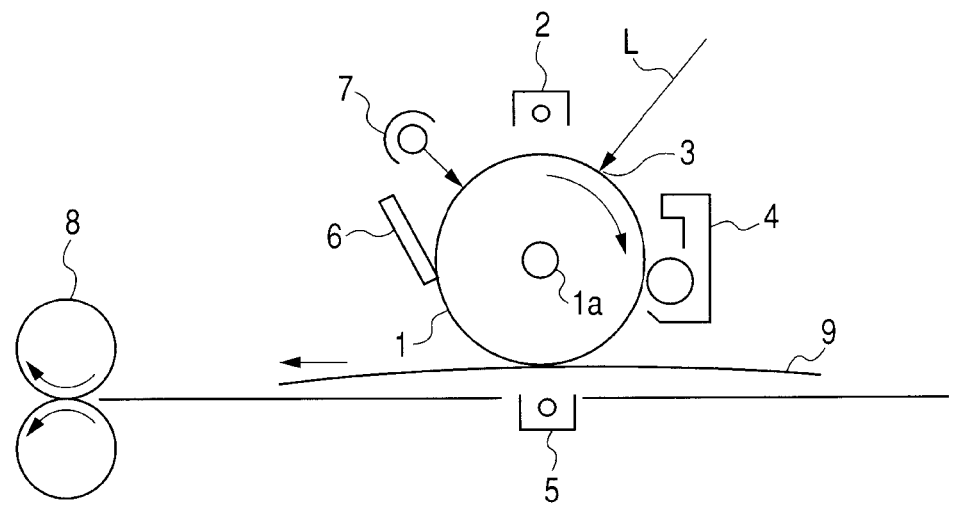
FIG. 1 is a drawing illustrating an example of a schematic structure of an electrophotographic apparatus comprising an electrophotographic photosensitive member of the present invention.

Preferred embodiments of the present invention will now be described in detail in accordance with the accompanying drawings.

The azo pigment of the present invention is an azo pigment having a group (organic residue) represented by the general formula (1) below:

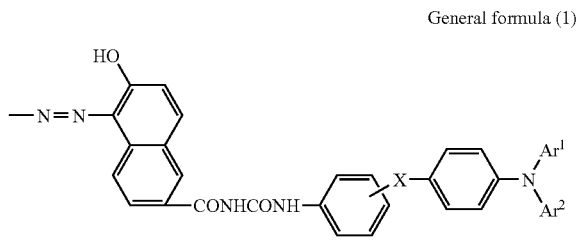

General formula (1)

$Ar^1$ and $Ar^2$ in the general formula (1) each independently represent a substituted or unsubstituted aryl group. In addition, X in the general formula (1) represents —CH$_2$—, —CH$_2$—CH$_2$—, —CH$_2$—CH$_2$—CH$_2$— or —CH=CH—.

Examples of the aryl group include a phenyl group, a biphenyl group, a naphthyl group and an anthryl group. In addition, examples of a substituent that the aryl group may have include alkyl groups such as a methyl group, an ethyl group, a propyl group and a butyl group; alkoxy groups such as a methoxy group, an ethoxy group and a propoxy group; halogen atoms such as a fluorine atom, a chlorine atom and a bromine atom; dialkylamino groups such as a dimethylamino group and a diethylamino group; a hydroxy group; a nitro group; a cyano group; an acetyl group; halomethyl groups such as a trifluoromethyl group; and halomethoxy groups such as a trifluoromethoxy group.

Among azo pigments having a group represented by the general formula (1) above, an azo pigment represented by the general formula (2) below is preferable.

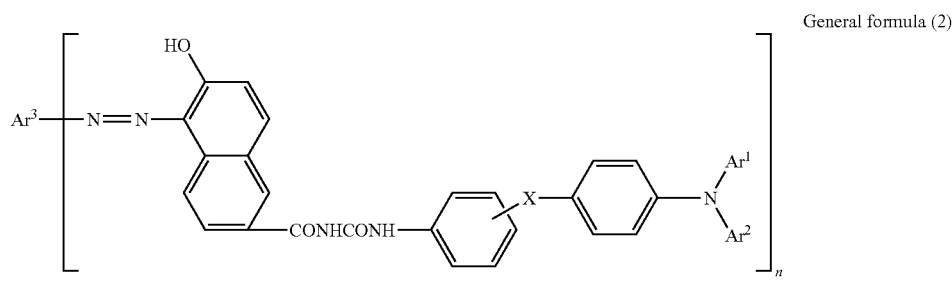

General formula (2)

$Ar^1$ and $Ar^2$ in the general formula (2) above are the same in meaning as $Ar^1$ and $Ar^2$ in the general formula (1) above and each independently represent a substituted or unsubstituted aryl group. In addition, X in the general formula (2) above is the same in meaning as X in the general formula (1) above and represents —CH$_2$—, —CH$_2$—CH$_2$—, —CH$_2$—CH$_2$—CH$_2$— or —CH=CH—. In addition, n in the general formula (2) above represents 1, 2, 3 or 4. In addition, $Ar^3$ in the general formula (2) above represents a group having a valence of n containing an aromatic hydrocarbon ring or an aromatic heterocycle.

Examples of the aromatic hydrocarbon ring include benzene, naphthalene, fluorene, phenanthrene, anthracene and pyrene. In addition, examples of the aromatic heterocycle include furan, thiophene, pyridine, indole, benzothiazole, carbazole, acridone, dibenzothiophene, benzoxazole, oxadiazole and thiazole.

In addition, $Ar^1$ and $Ar^2$ in the general formulas (1) and (2) are preferably substituted or unsubstituted phenyl groups among the groups above. In addition, X in the general formulas (1) and (2) above is preferably —CH$_2$—CH$_2$— among the groups above.

In addition, among azo pigments represented by the general formula (2) above, an azo pigment represented by the general formula (3) below is more preferably:

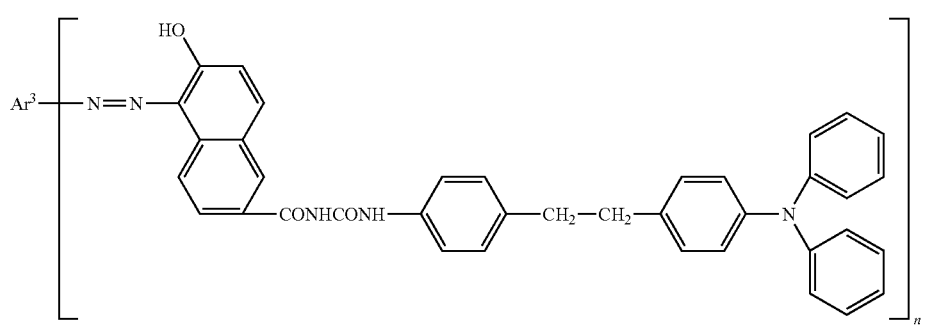

General formula (3)

n in the general formula (3) above is the same in meaning as n in the general formula (2) above and represents 1, 2, 3 or 4. In addition, $Ar^3$ in the general formula (3) above is the same in meaning as $Ar^3$ in the general formula (2) above and represents a group having a valence of n containing an aromatic hydrocarbon ring or an aromatic heterocycle.

In addition, $Ar^3$ in the general formulas (2) and (3) above is, among the groups above, preferably a group represented by any one selected from the group consisting of the structural formulas (4) to (7) below:

Structural formula (4)

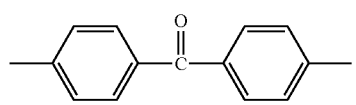

Structural formula (5)

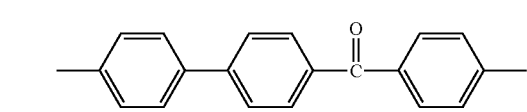

Structural formula (6)

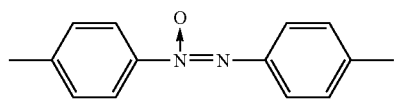

Structural formula (7)

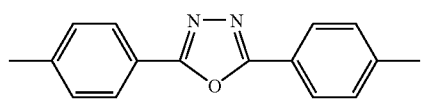

The azo pigment of the present invention may be crystalline or amorphous.

Preferred examples (exemplified compounds) of an azo pigment having a group represented by the general formula (1) are given below but the present invention is not limited thereto.

Exemplified compound (1)

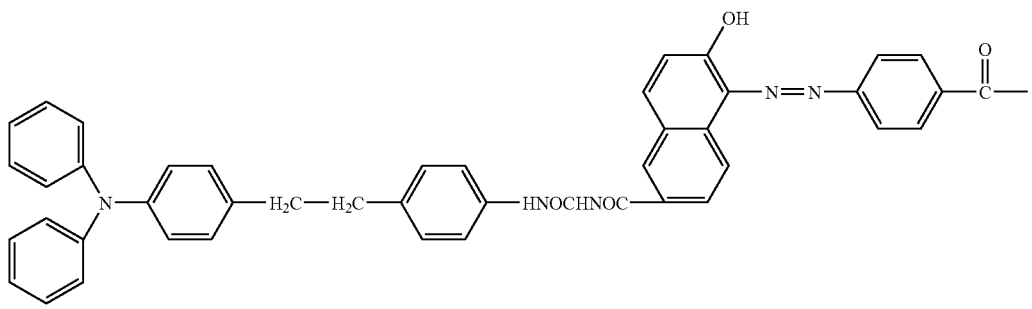

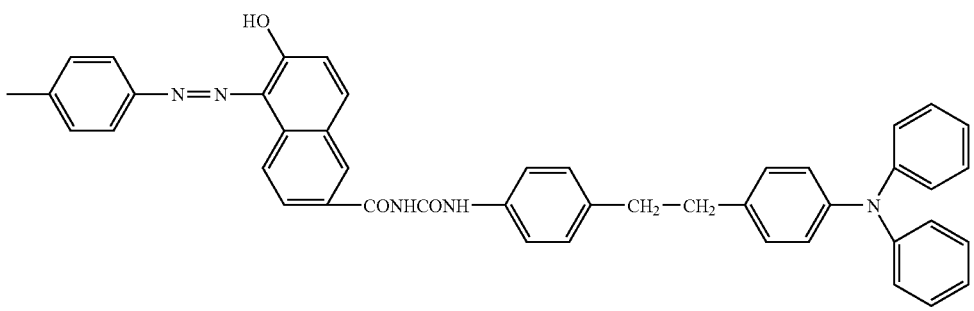

-continued
Exemplified compound (2)
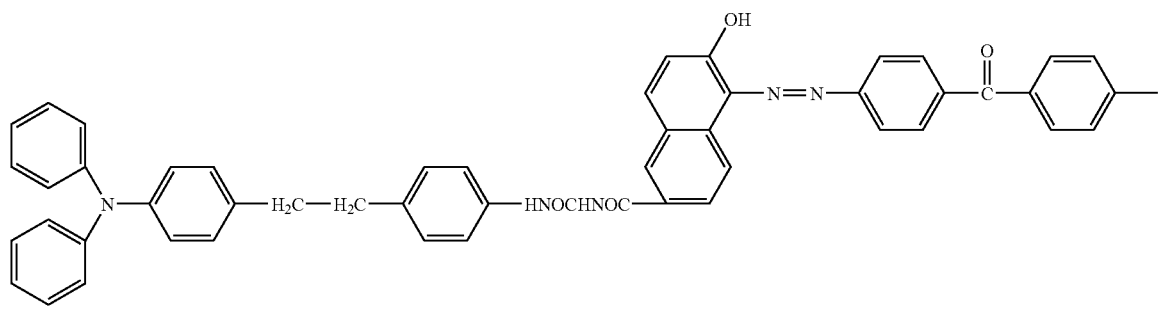
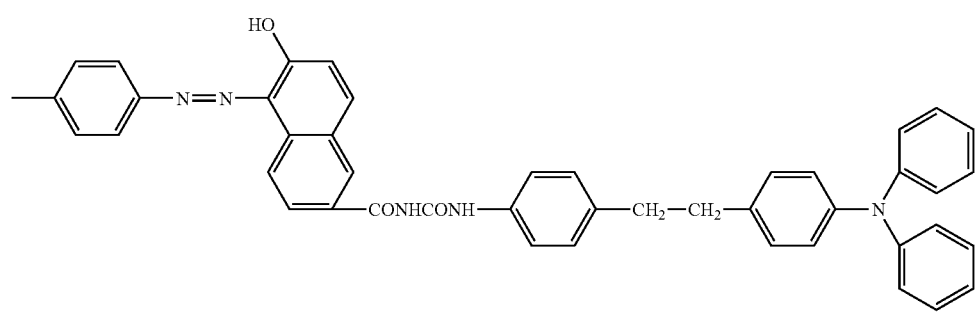
Exemplified compound (3)
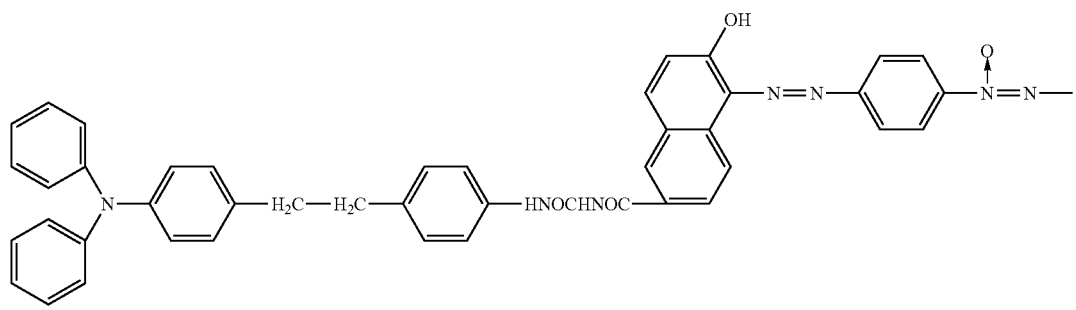
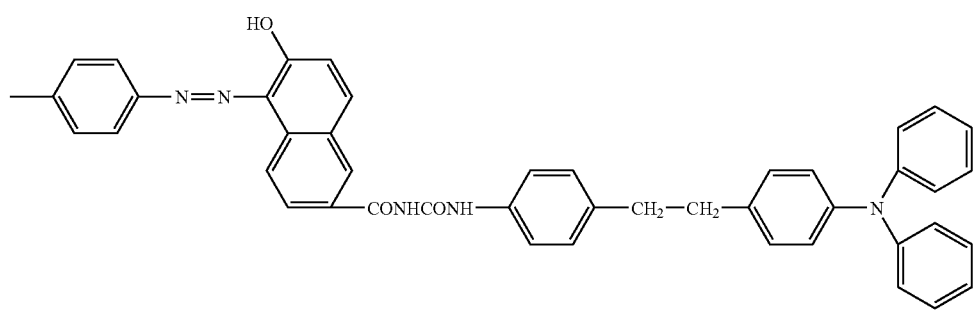
Exemplified compound (4)
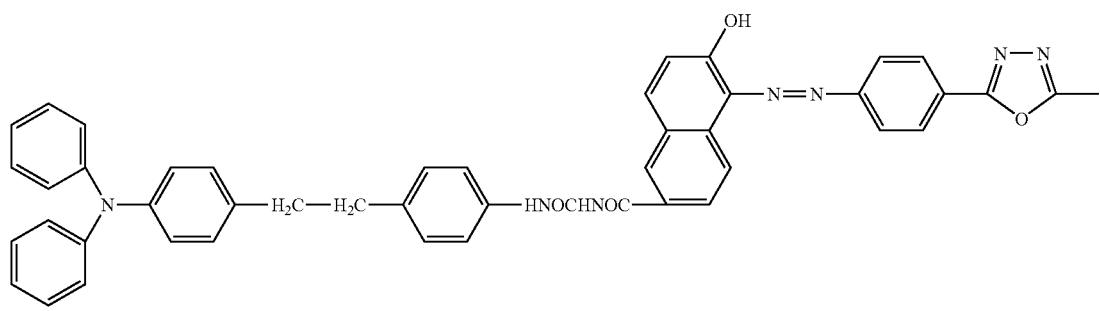

-continued
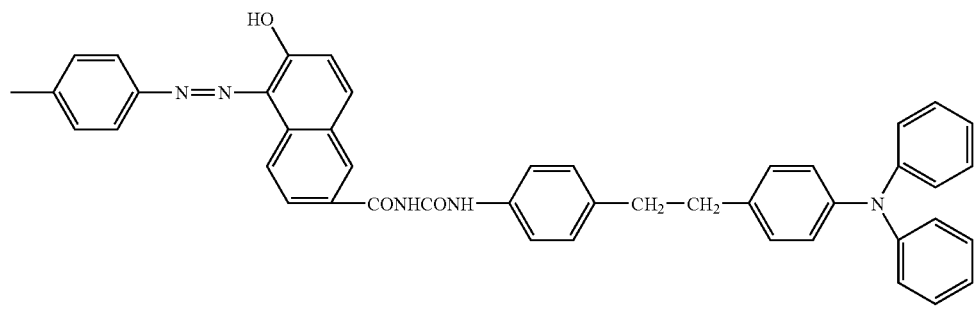
Exemplified compound (5)
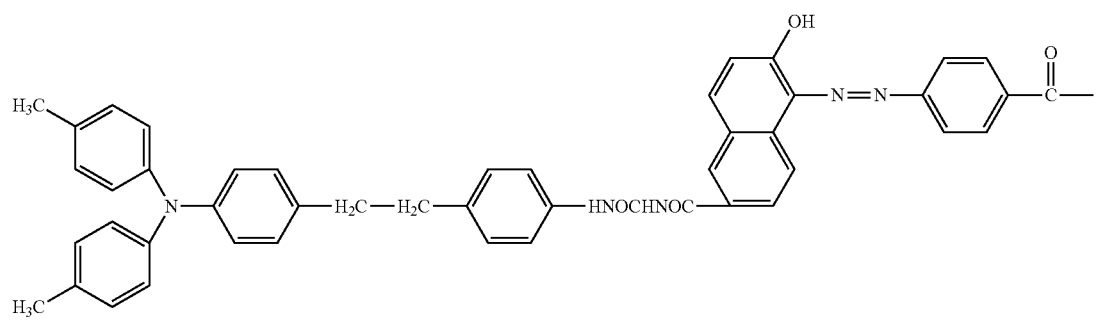
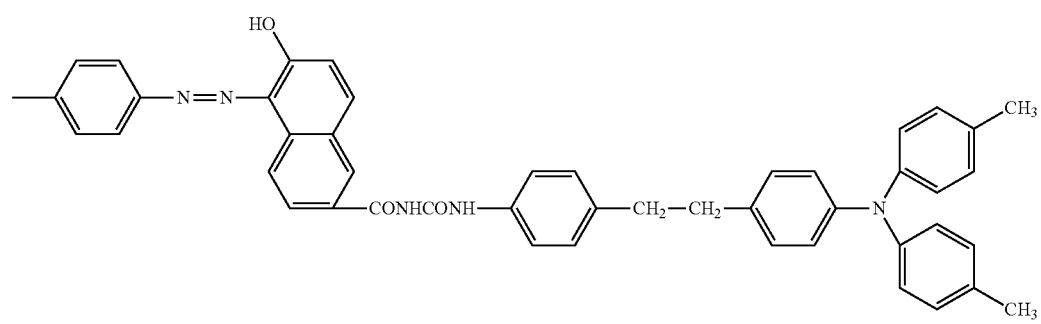
Exemplified compound (6)
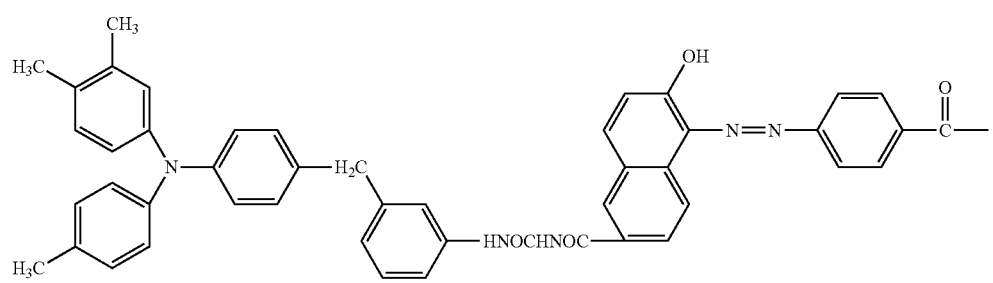
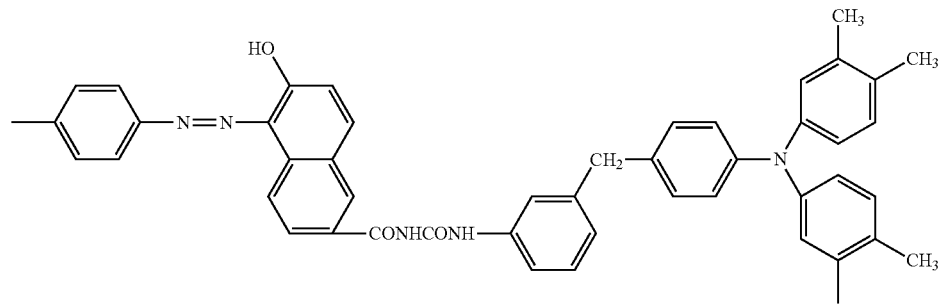

-continued
Exemplified compound (7)
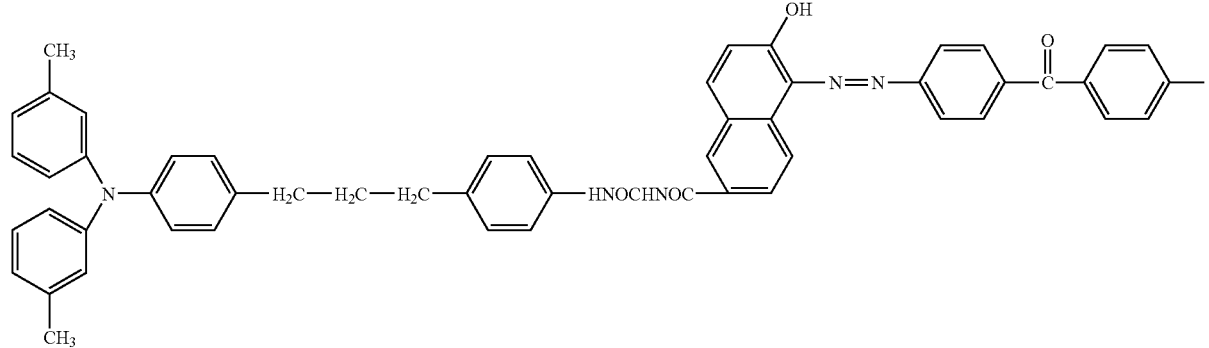
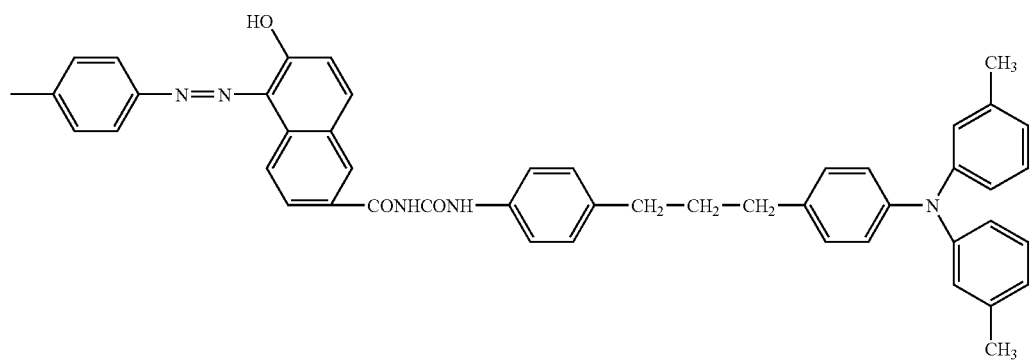
Exemplified compound (8)
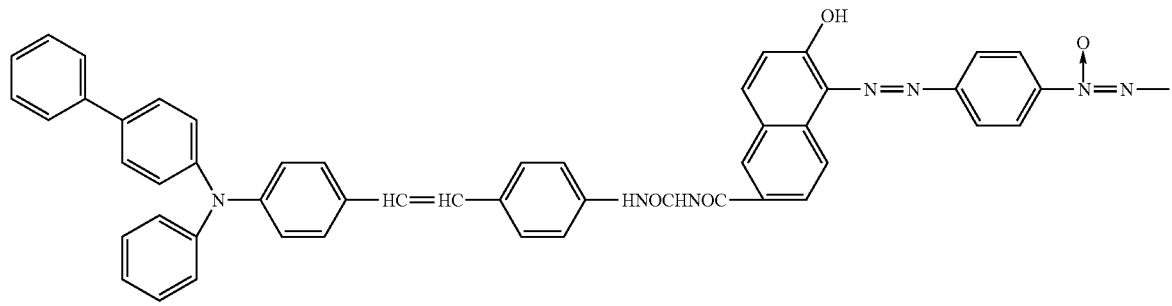
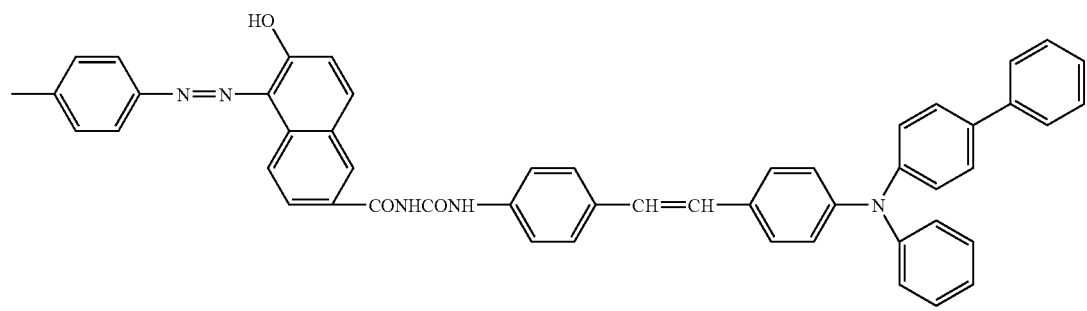

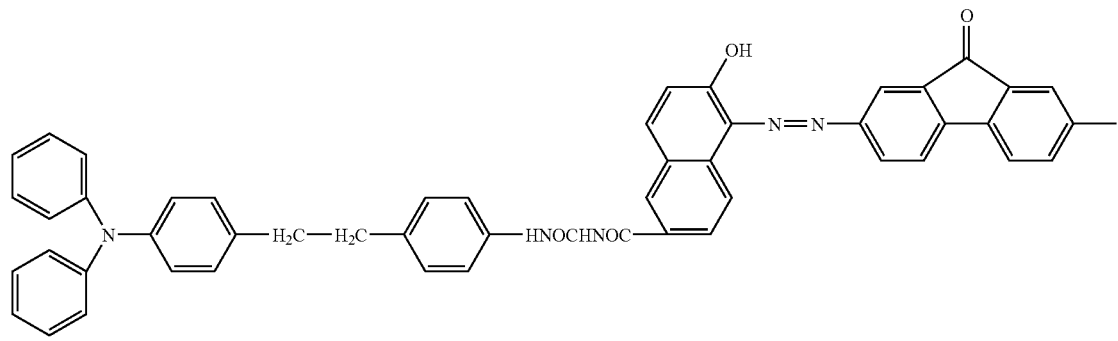
Exemplified compound (9)
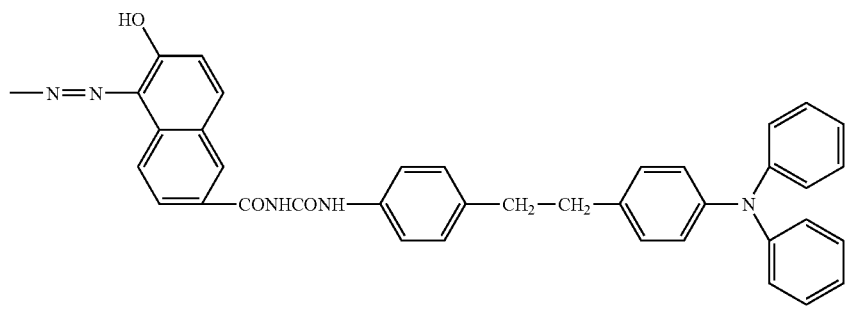
Exemplified compound (10)
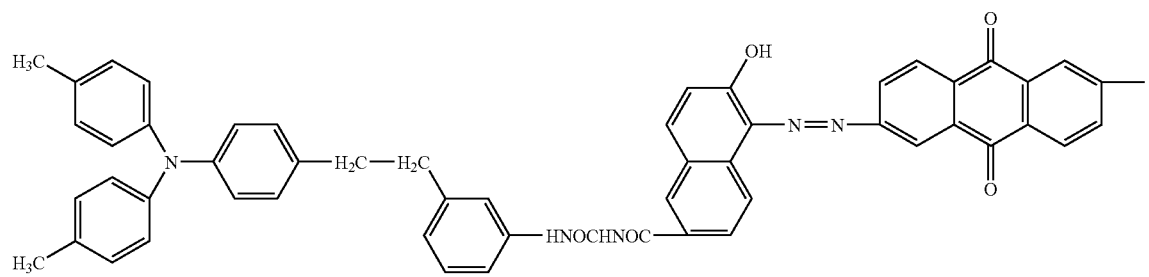
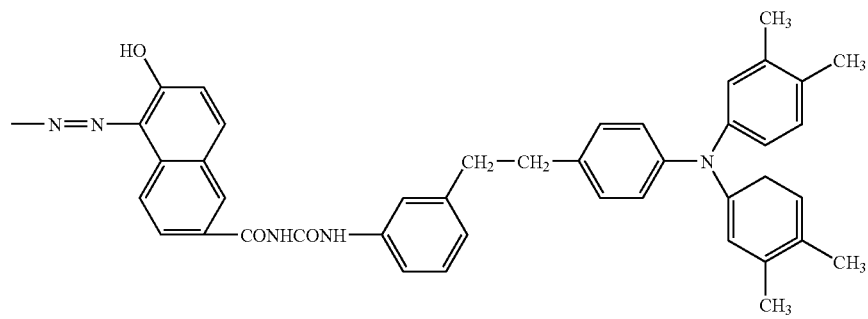
Exemplified compound (11)
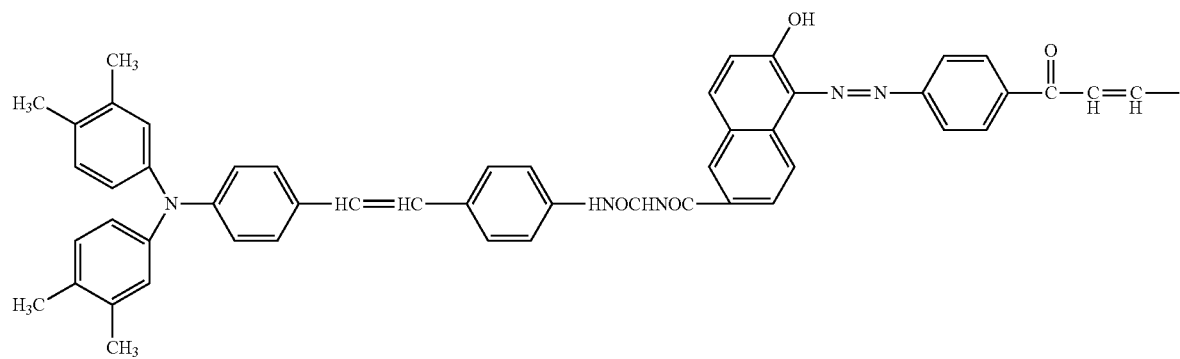

-continued
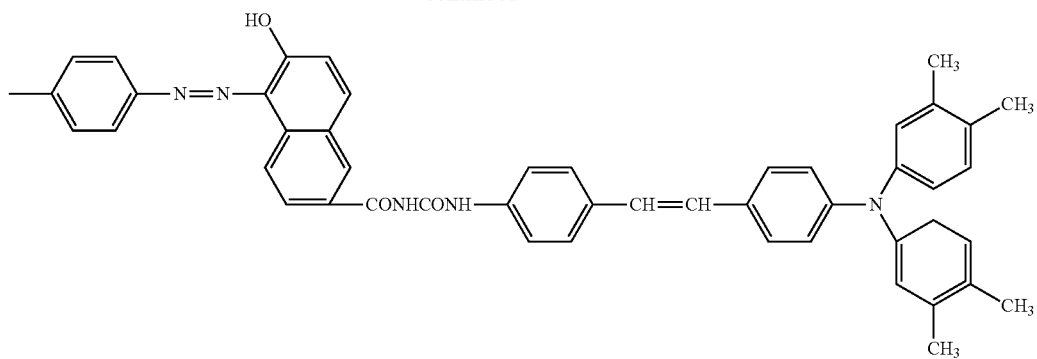
Exemplified compound (12)
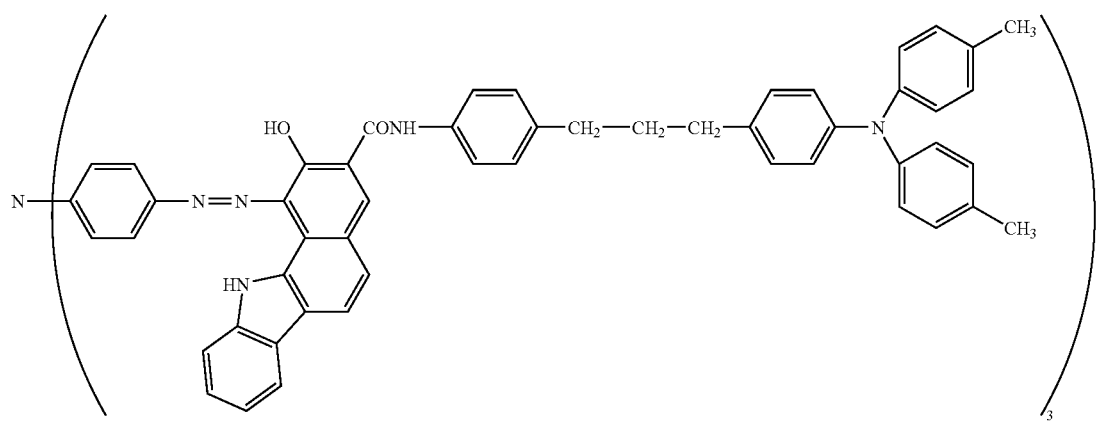
Exemplified compound (13)
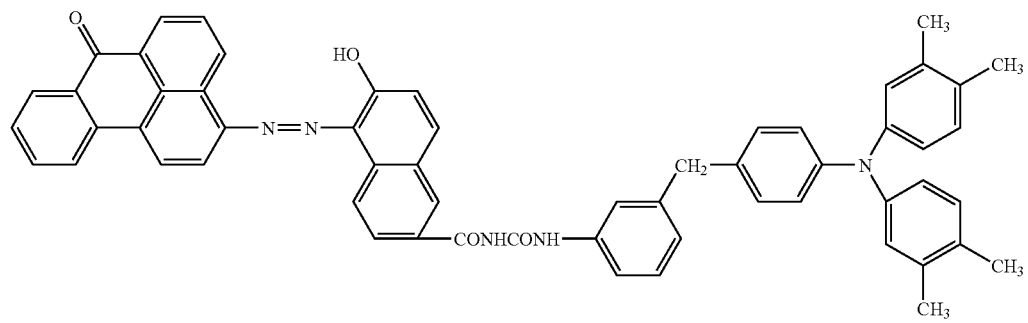
Exemplified compound (14)
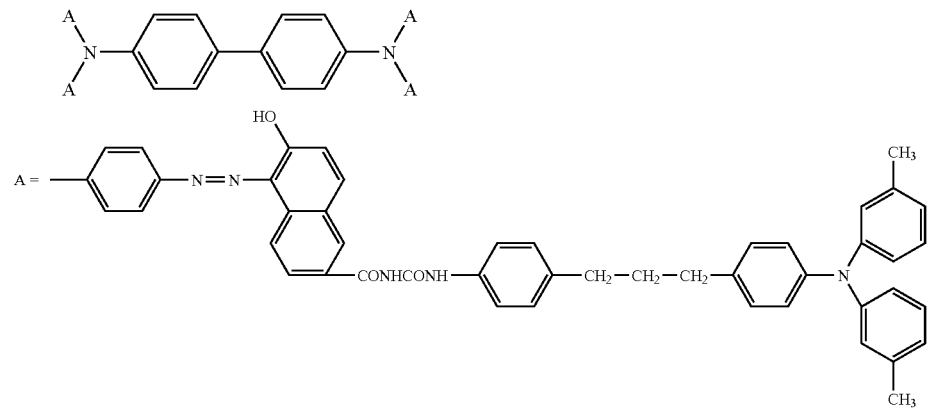

-continued
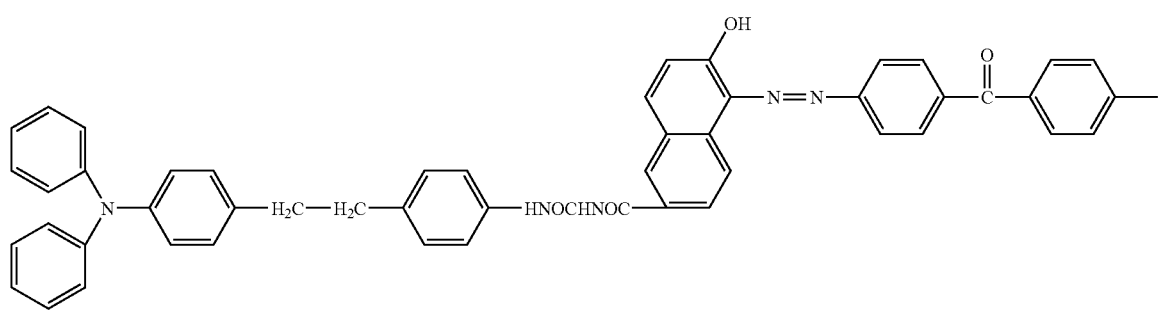
Exemplified compound (15)
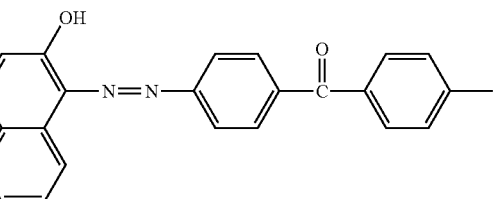
Exemplified compound (16)
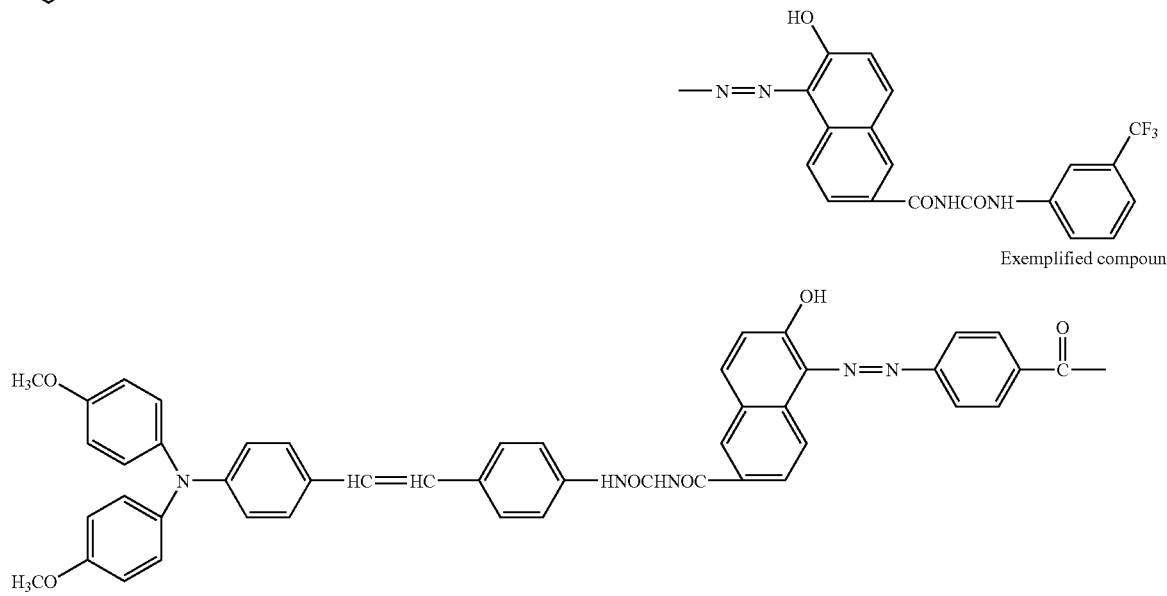
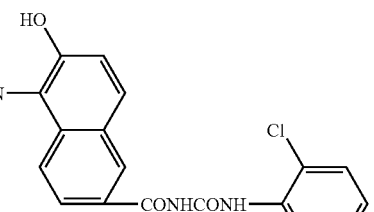
Exemplified compound (17)
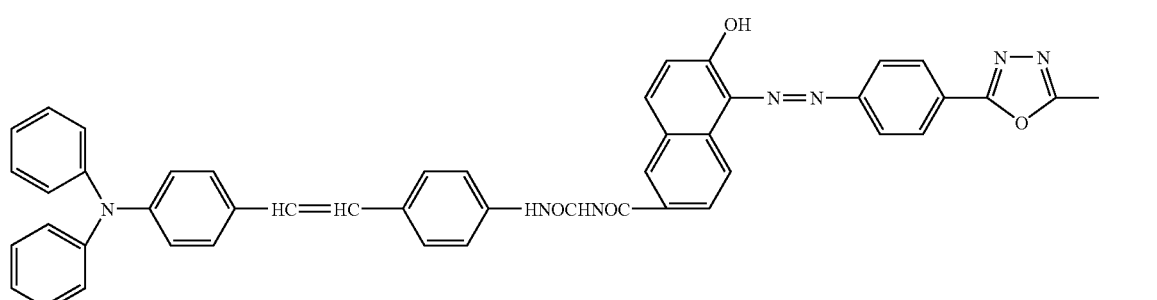
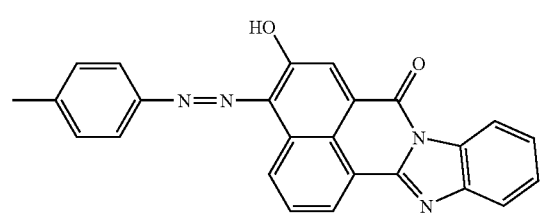

Next, the electrophotographic photosensitive member of the present invention will be described below.

The electrophotographic photosensitive member of the present invention has a support, an intermediate layer provided on the support and a photosensitive layer provided on the intermediate layer.

The photosensitive layer is preferably a laminated photosensitive layer obtained by laminating a charge generation layer having a charge generation material and a charge transport layer having a charge transport material in this order from the support side.

In addition, an electrically conductive layer may be provided between the support and the intermediate layer as needed.

In addition, a protective layer may be provided on the photosensitive layer as needed.

The support needs only to be a member that is electrically conductive (an electrically conductive support). Examples of materials of the support include aluminum, aluminum alloys, copper, zinc, stainless steel, vanadium, molybdenum, chromium, titanium, nickel, indium, gold and platinum. In addition, the support may be a plastic (e.g., polyethylene, polypropylene, polyvinyl chloride, polyethylene terephthalate or acrylic resin) on which a coating of these metals or alloys is formed by vacuum deposition. In addition, the support may be any of the metals, alloys or plastics above coated with electrically conductive particles (e.g., carbon black and silver particles) along with an appropriate binding resin. In addition, the support may be a support obtained by impregnating a plastic or paper with electrically conductive particles.

In addition, the surface of a support comprising, for example, aluminum or an aluminum alloy may be subjected to roughening treatment such as honing, centerless grinding or cutting. In addition, this roughening treatment can control the support surface to an appropriate roughness to prevent interference fringes. The ten-point height of irregularities Rzjis of the support surface is preferably 0.05 μm or more and more preferably 0.1 μm or more. The ten-point height of irregularities Rzjis was measured according to the JIS B0601 (2001) with Surfcorder SE-3500 (Kosaka Laboratory Ltd.) under the conditions: cutoff, 0.8 mm; and measurement length, 8 mm.

An electrically conductive layer may be provided on the support, for example to cover variations in and defects of the support and prevent interference fringes.

The electrically conductive layer can be formed by coating the support with a binding resin in which electrically conductive particles such as carbon black, metal particles or metal oxide are dispersed. The film thickness of electrically conductive layer is preferably 1 to 40 μm and more preferably 1 to 35 μm.

An intermediate layer is provided between the support or the electrically conductive layer and the photosensitive layer (charge generation layer, charge transport layer). The intermediate layer is provided, for example to ensure the adhesion between the photosensitive layer and the support or the electrically conductive layer, to protect the photosensitive layer against electrical breakdown and to improve the carrier injection properties of the photosensitive layer.

For the electrophotographic photosensitive member of the present invention, the intermediate layer contains an azo pigment of the present invention. Specifically, a binding resin (e.g., polyamide) and a solvent (e.g., alcohol solvent) are used to prepare a dispersion (intermediate layer-forming coating liquid) where an azo pigment of the present invention is dispersed. Then, this intermediate layer-forming coating liquid can be applied onto the support or the electrically conductive layer and the coating thereon is dried to form an intermediate layer. The azo pigments may be used alone or in combination of two or more. The ratio (a/b) of the mass of the azo pigment, (a), to the mass of the binding resin, (b), that are contained in the intermediate layer-forming coating liquid is preferably 1/1,000 to 10/1 and more preferably 1/100 to 5/1 in view of dispersibility and storage stability after dispersion.

Examples of the binding resin used in the intermediate layer include polyamide, polyvinyl alcohol, polyethylene oxide, ethylcellulose, methyl cellulose, casein, glue and gelatin.

The film thickness of the intermediate layer is preferably 0.2 to 3.0 μm.

If the photosensitive layer is a laminated photosensitive layer, a charge generation layer is provided on the intermediate layer.

A charge generation layer can be formed by applying a charge generation layer-forming coating liquid, which is obtained by dispersing a charge generation material along with a binding resin and a solvent, and drying the coating. Examples of the dispersion method include methods using a homogenizer, ultrasound, a ball mill, a sand mill, an attritor, a roll mill or the like.

As the charge generation material, a known charge generation material can be used. Examples thereof include cationic dyes such as pyrylium dyes, thiapyrylium dyes, azulenium dyes, thiacyanine dyes and quinocyanine dyes; polycyclic quinone pigments such as squarylium salt dyes, anthanthrone pigments, dibenzpyrenequinone pigments and pyranthrone pigments; indigo pigments, quinacridone pigments, perylene pigments, phthalocyanine pigments and azo pigments.

Examples of the binding resin used in the charge generation layer include polyvinyl butyral, polyvinyl benzal, polyarylate, polycarbonate, polyester, phenoxy resin, cellulosic resin, acrylic resin and polyurethane. In addition, copolymers of these resins can also be used. Among these resins, resins having a substituent such as a halogen atom, an alkyl group, an alkoxy group, a nitro group, a cyano group and a trifluoromethyl group are preferable. The ratio of the mass of the binding resin in the charge generation layer to the total mass of the charge generation layer is preferably 80% by mass or less and more preferably 60% by mass or less.

Example of a solvent used in the charge generation layer-forming coating liquid include ethers such as tetrahydrofuran, 1,4-dioxane and 1,2-dimethoxyethane; ketones such as cyclohexanone, methyl ethyl ketone and pentanone; amines such as N,N-dimethylformamide; esters such as methyl acetate and ethyl acetate; aromatic solvents such as toluene, xylene and chlorobenzene; alcohols such as methanol, ethanol and 2-propanol; and aliphatic halogenated hydrocarbons such as chloroform, methylene chloride, dichloroethylene, carbon tetrachloride and trichloroethylene.

The film thickness of the charge generation layer is preferably 5 μm or less and more preferably 0.1 to 2 μm.

In addition, various additives such as sensitizers, antioxidants, ultraviolet absorbers, plasticizers and thickeners can also be added to the charge generation layer as needed.

If the photosensitive layer is a laminated photosensitive layer, a charge transport layer is provided on the charge generation layer.

The charge transport layer functions to receive a carrier from the charge generation layer and transport in the presence of an electric field. The charge transport layer can be formed by applying a charge transport layer-forming coating liquid, which is obtained by dissolving a charge transport material in a solvent as needed along with a binding resin, and drying the coating.

The film thickness of the charge transport layer is preferably 3 to 40 μm and more preferably 4 to 30 μm.

Charge transport materials are roughly divided into electron transport materials and hole transport materials.

Examples of electron transport materials include electron-accepting compounds such as 2,4,7-trinitrofluorenone, 2,4,5,7-tetranitrofluorenone, chloranil and tetracyanoquinodimethane and polymerized products thereof.

Examples of hole transport materials include polycyclic aromatic compounds such as pyrene and anthracene; heterocyclic compounds such as carbazole compounds, indole compounds, oxazole compounds, thiazole compounds, oxadiazole compounds, pyrazole compounds, pyrazoline compounds, thiadiazole compounds and triazole compounds; hydrazone compounds; styryl compounds; benzidine compounds; triarylmethane compounds; phenylenediamine compounds; biscyclohexylamine compounds; and triphenylamine compounds.

The charge transport materials may be used alone or in combination of two or more.

In addition, if a charge transport material has film formability, a binding resin does not necessarily need to be used.

Examples of a binding resin used in the charge transport layer include insulating resins such as acrylic resin, polyarylate, polycarbonate, polyester, polystyrene, acrylonitrile-styrene copolymer, polyacrylamide, polyamide and chlorinated rubber. In addition, organic photoconductive polymers having both functions of a charge transport material and a binding resin, such as poly-N-vinylcarbazole and polyvinylanthracene, can also be used. These can be used as a homopolymer, a mixture, or a copolymer alone or in combination of two or more.

Examples of a solvent used in a charge transport layer-forming coating liquid include ketones such as acetone and methyl ethyl ketone; ethers such as tetrahydrofuran and dimethoxymethane; esters such as methyl acetate and ethyl acetate; aromatic hydrocarbons such as toluene and xylene; alkylcyclohexanes such as methylcyclohexane and ethylcyclohexane; and hydrocarbons at least a part of the hydrogen atoms of which is substituted with a halogen atom such as chlorobenzene, chloroform and carbon tetrachloride.

In addition, additives such as antioxidants, ultraviolet absorbers, plasticizers and fillers can also be added to the charge transport layer as needed.

In addition, a protective layer may be provided on the photosensitive layer (charge generation layer, charge transport layer) in order to protect the photosensitive layer against an external mechanical force, an external chemical force and the like and to improve the transferability and cleanability.

The protective layer can be formed by applying a protective layer-forming coating liquid obtained by dissolving various resins in a solvent and drying the coating.

Examples of a resin used in the protective layer include polyvinyl butyral, polyester, polycarbonate, polyamide, polyimide, polyarylate, polyurethane, styrene-butadiene copolymer, styrene-acrylic acid copolymer and styrene-acrylonitrile copolymer.

In addition, to make the protective layer also have charge transport capacity, the protective layer may be formed by curing a monomer- or polymer-type charge transport material having charge transport capacity by using any of various crosslinking reactions. Examples of the curing reactions include radical polymerization, ionic polymerization, thermal polymerization, photopolymerization, radiation polymerization (electron beam polymerization), plasma CVD and photo CVD.

Moreover, additives such as electrically conductive particles, ultraviolet absorbers and wear/abrasion resistance improvers may be added to the protective layer. Examples of the electrically conductive particles include particles of metal oxides such as tin oxide. Examples of the wear/abrasion resistance improvers include fluorine atom-containing resin particles, alumina particles and silica particles.

The protective layer has a film thickness of preferably 0.5 to 20 μm and more preferably 1 to 10 μm.

Examples of the coating methods that can be used when the above coating liquids for the layers are applied include dip coating, spray coating, spinner coating, roller coating, Meyer bar coating and blade coating.

Next, electrophotographic apparatuses using an electrophotographic photosensitive member of the present invention will be described below.

FIG. 1 is a drawing illustrating an example of a schematic structure of an electrophotographic apparatus comprising an electrophotographic photosensitive member of the present invention.

In FIG. 1, reference numeral 1 represents a drum-type electrophotographic photosensitive member of the present invention that is rotary-driven around an axis 1a in the arrow direction at a specified circumferential speed. The electrophotographic photosensitive member 1 has its circumference surface uniformly charged at a specified positive or negative potential by a charging device (e.g., corona charger 2) during its rotation and then has an exposure portion 3 thereof exposed to exposing light L (e.g., laser beam scanning exposing light) by an exposure device not illustrated. These actions allow electrostatic latent images corresponding to exposure images to be sequentially formed on the surface of the electrophotographic photosensitive member. The electrostatic latent images are then developed by a developing device 4 to form toner images. The toner images are sequentially transferred on a transfer material 9 fed between the electrophotographic photosensitive member 1 and the transfer device from a paper feed portion not illustrated by a transfer device (e.g., transfer corona charger 5) in synchronization with the rotation of the electrophotographic photosensitive member 1. The transfer material 9 onto which the images are transferred is separated from the surface of the electrophotographic photosensitive member 1 and introduced into a fixing device 8 where the images on the material are then fixed and the material is printed out of the apparatus as a copy. The toner remaining after transfer is removed from the surface of the electrophotographic photosensitive member 1 after image transfer by a cleaning device 6 to make the surface clean. Electricity is then removed from the photosensitive member by a pre-exposure device 7 and the photosensitive member is recycled for image formation.

Figure 2:
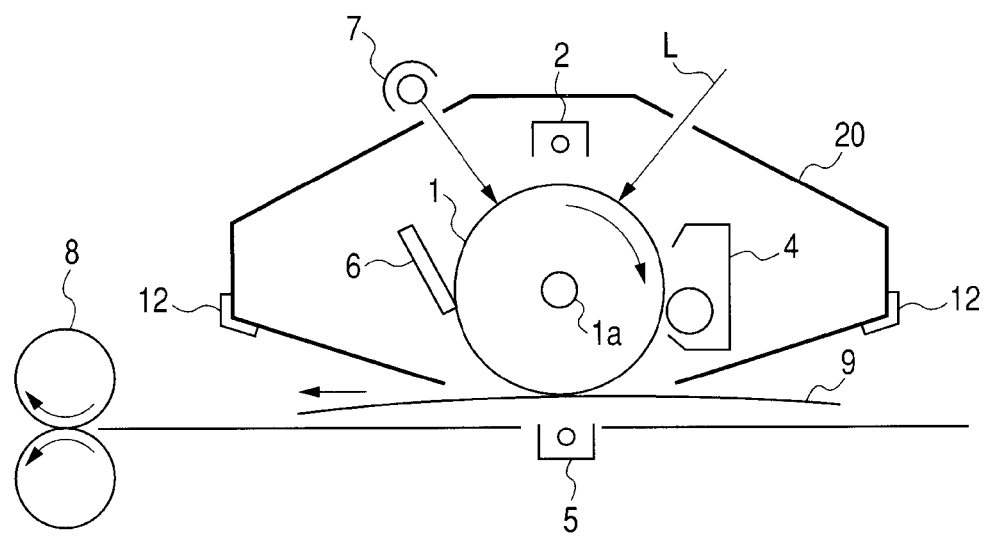
FIG. 2 is a drawing illustrating an example of a schematic structure of an electrophotographic apparatus comprising a process cartridge comprising an electrophotographic photosensitive member of the present invention.

In addition, in the electrophotographic apparatus illustrated in FIG. 2, an electrophotographic photosensitive member 1, a charging device (corona charger 2) and a developing device 4 are integrally stored in a container 20 to use it as a process cartridge. This process cartridge is adapted to be detachably attached to the main body of the electrophotographic apparatus by using a guiding device 12 such as the rails of the main body of the electrophotographic apparatus. The cleaning device 6 may be placed in the container 20 or not.

Figure 3:
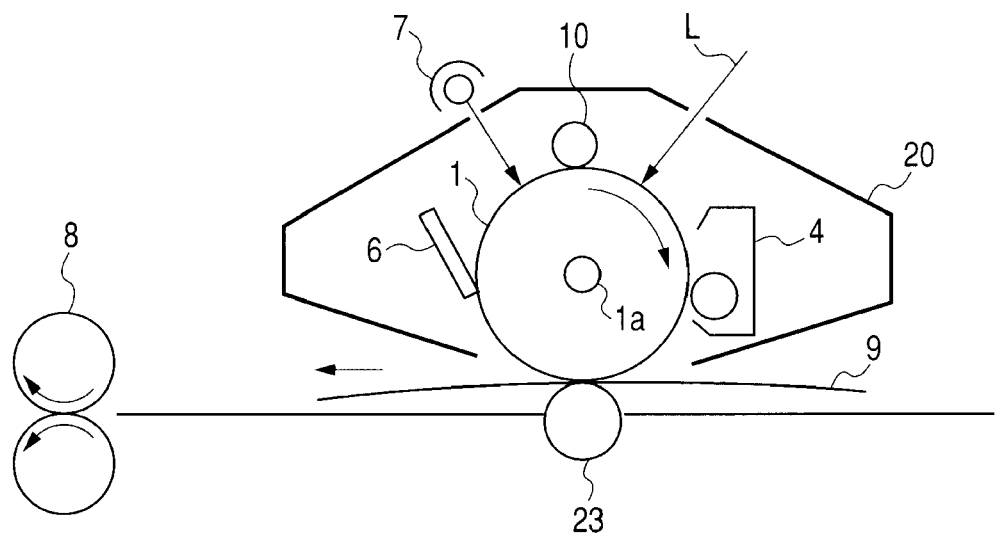
FIG. 3 is a drawing illustrating another example of a schematic structure of an electrophotographic apparatus comprising a process cartridge comprising an electrophotographic photosensitive member of the present invention.
Figure 4:
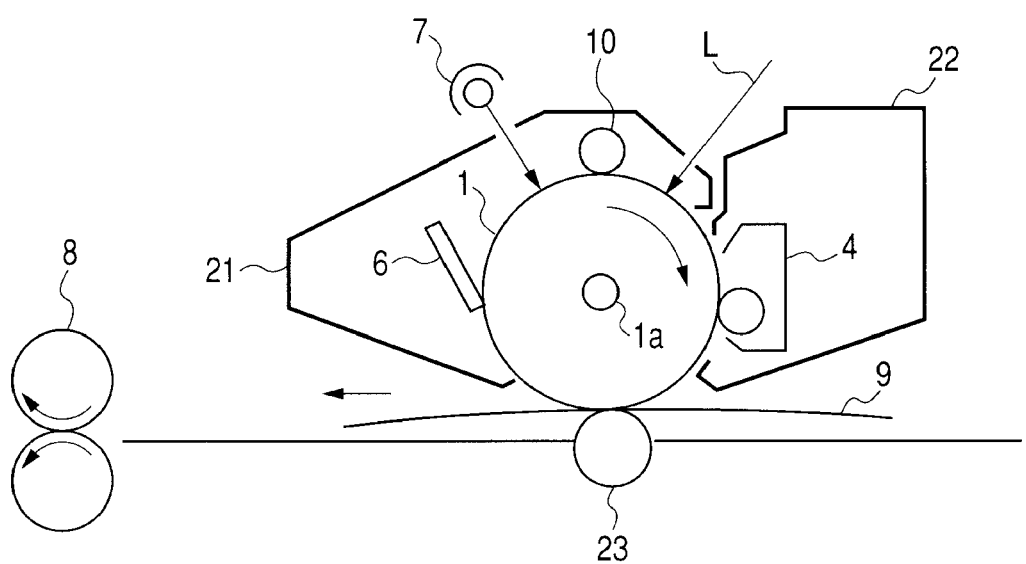
FIG. 4 is a drawing illustrating an example of a schematic structure of an electrophotographic apparatus comprising a first process cartridge comprising an electrophotographic photosensitive member of the present invention and a second process cartridge.

In addition, as illustrated in FIGS. 3 and 4, an electrophotographic photosensitive member 1 may be charged by using a contact charging member 10 as the charging device to bring the voltage-applied contact charging member 10 into contact with the electrophotographic photosensitive member 1 (this charging method is called contact charging).

In addition, in the electrophotographic apparatuses illustrated in FIGS. 3 and 4, the toner images on the electrophotographic photosensitive member 1 are transferred onto the transfer material 9 by a transfer contact charging member 23 as the transfer device. In other words, the toner images on the electrophotographic photosensitive member 1 are transferred onto the transfer material 9 by bringing the voltage-applied transfer contact charging member 23 into contact with the transfer material 9.

Moreover, in the apparatus illustrated in FIG. 4, the electrophotographic photosensitive member 1 and a contact charging member 10 are integrally stored in a first container 21 to use it as a first process cartridge, and a developing device 4 is stored in a second container 22 to use it as a second process cartridge. These first and second process cartridge are adapted to be detachably attached to the main body of the electrophotographic apparatus. A cleaning device 6 may be placed in the container 21 or not.

If the electrophotographic apparatus is used as a copier or a printer, reflected light reflected off by the original document or transmitted light passing through the original document is used as the exposing light L. Alternatively, the original document is read out and converted to signals, and is scanned by a semiconductor laser or the like according to scanning signals for exposure image formation.

Next, a developer (toner) used in the electrophotographic apparatus will be described below.

The toner preferably has a specified particle size distribution. If toner particles having a particle size of 5 μm or less account for less than 17% by particle count, the toner tends to be consumed more. In addition, if a toner has a volume-average particle size (Dv [μm]) of 8 μm or more and a weight-average particle size (D4 [μm]) of 9 μm or more, the resolution of dots having a size of 100 μm or less tends to decrease. In this case, development by a design requiring other unreasonable development conditions easily causes for example line thickening and toner scattering as well as increased toner consumption, making it difficult to obtain stable development.

On the other hand, if toner particles having a particle size of 5 μm or less exceed 90% by particle count, it is difficult to stabilize the development. To further improve the resolution, a toner comprises fine particles having preferably $3.0\ \mu m \leq Dv \leq 6.0\ \mu m$ and $3.5\ \mu m \leq D4 \leq 6.5\ \mu m$ and more preferably $3.2\ \mu m \leq Dv \leq 5.8\ \mu m$ and $3.6\ \mu m \leq D4 \leq 6.3\ \mu m$.

Examples of a binding resin used in the toner include styrene homopolymers or copolymers such as polystyrene, styrene-acrylic acid ester copolymer, styrene-methacrylic acid ester copolymer and styrene-butadiene copolymer; polyester resins; epoxy resins; and petroleum-based resins.

A toner preferably contains waxes in view of improving the release from the fixing member during fixing and the fixability. Examples of the waxes include paraffin wax and derivatives thereof, microcrystalline wax and derivatives thereof, Fischer-Tropsch wax and derivatives thereof, polyolefin wax and derivatives thereof and carnauba wax and derivatives thereof. Examples of these derivatives include oxides, block copolymers with vinyl-based monomers and graft-modified products. In addition to them, long-chain alcohols, long-chain fatty acids, acid amide compounds, ester compounds, ketone compounds, hydrogenated castor oil and derivatives thereof, plant waxes, animal waxes, mineral waxes and petrolatum can also be used.

As a colorant used in the toner, conventionally known inorganic pigments, organic dyes and organic pigments can be used. Examples of the colorant include carbon black, aniline black, acetylene black, naphthol yellow, Hansa yellow, rhodamine lake, alizarin lake, colcothar, phthalocyanine blue and indanthrene blue. These are usually used at a content of 0.5 to 20% by mass with respect to the binding resin.

A magnetic material may be used as a toner constituent. Examples of the magnetic material include magnetic metal oxides containing an element such as iron, cobalt, nickel, copper, magnesium, manganese, aluminum or silicon. Among these, a magnetic material composed mainly of a magnetic iron oxide such as triiron tetroxide and γ-iron oxide is preferable.

In addition, to control toner charge, nigrosine dyes, quaternary ammonium salts, metal complexes of salicylic acid, metal salts of salicylic acid, metal complexes of salicylic acid derivatives, salicylic acid and acetyl acetone can be used.

A toner whose toner particles have an inorganic fine powder on their surface is preferable, and is effective in improving the development efficiency and the reproducibility and transfer efficiency of electrostatic latent images and reducing fogging.

Examples of the inorganic fine powder include fine powders such as colloidal silica, titanium oxide, iron oxide, aluminum oxide, magnesium oxide, calcium titanate, barium titanate, strontium titanate, magnesium titanate, cerium oxide and zirconium oxide. The inorganic fine powders may be used alone or as a mixture of two or more. Among the fine powders above, fine powders of oxides or double oxides such as titania, alumina and silica are preferable.

In addition, an inorganic fine powder is preferably hydrophobized. Especially, an inorganic fine powder is preferably surface-treated with a silane coupling agent or a silicone oil. An example of the hydrophobization treatment is a method where an inorganic fine powder is treated with an organic metal compound such as a silane coupling agent or a titanium coupling agent that reacts with or is physically adsorbed onto the inorganic fine powder. In addition, another example of the hydrophobization treatment is a method where after or just when an inorganic fine powder is treated with a silane coupling agent, the powder is treated with an organic silicon compound such as silicone oil.

An inorganic fine powder has a specific surface area, as determined by nitrogen adsorption according to BET, preferably of 30 $m^2$/g or more and particularly more preferably in the range of 50 to 400 $m^2$/g. The amount of inorganic fine powder hydrophobized is preferably 0.01 to 8% by mass with respect to the toner particles, further more preferably 0.1 to 5% by mass and particularly much more preferably 0.2 to 3% by mass.

Other additives may be further added to a toner as long as its amount added has practically no adverse effect on the toner. Examples of such other additives include lubricant powders such as polytetrafluoroethylene powder, zinc stearate powder and polyvinylidene fluoride powder; abrasives such as cerium oxide powder, silicon carbide powder and strontium titanate powder; fluidizers such as titanium oxide powder and aluminum oxide powder; caking inhibitors; electrical conductivity-imparting agents such as carbon black powder, zinc oxide powder and tin oxide powder; and developability improvers such as organic and inorganic fine particles that have the polarity opposite to that of the toner.

A known method is used to prepare a toner. An example thereof is as follows. Toner-constituting materials are thoroughly mixed in a mixer, and then the mixture is melted and kneaded with a thermal kneader to make the resins compatible with each other. Next, the toner-constituting materials are further dispersed or dissolved in the resulting product, which is then cooled and solidified and finally pulverized and classified. Examples of the mixer include a Henschel mixer and a ball mill. Examples of the toner-constituting materials mixed in a mixer include binding resins, waxes, metal salts or metal complexes, pigments and dyes as colorants or magnetic materials as well as charge control agents and other additives as needed. In addition, examples of the thermal kneader include heating rolls, kneaders and extruders. Examples of the toner-constituting materials that are added to the product obtained by making the resins compatible with each other include metal compounds, pigments, dyes and magnetic materials. In the classification step, a multi-division classifier is preferably used in view of production efficiency.

In addition, another example of a toner preparation method is a method where a polymerizable monomer, a colorant and the like are suspended in an aqueous solvent and polymerized to directly produce toner particles. Alternatively, toner particles can be produced by a method where polymer fine particles obtained by emulsion polymerization or the like are dispersed in an aqueous medium and associated and fused with a colorant.

Moreover, a toner may be used as a magnetic one-component developer or non-magnetic one-component developer, and may be mixed with carrier particles and used as a two-component developer.

The development method is preferably a method where a developer containing a toner and the surface of an electrophotographic photosensitive member are brought into contact with each other and that uses discharged-area development. If magnetic brush development that uses a toner and a magnetic carrier is used, examples of the magnetic carrier include magnetic ferrite, magnetite, iron powder, or those coated with a resin such as acrylic resin, silicone resin or fluororesin.

The present invention will be described below more specifically below based on Examples thereof.

Synthetic Example 1

Synthesis of Exemplified Compound (1)

700 mL of ion-exchange water (electric conductivity, $1 \times 10^{-4}$ S/m or less; the same shall apply hereinafter), 102.5 mL (1.13 mol) of concentrated hydrochloric acid and 30.0 g (0.14 mol) of 4,4'-diaminobenzophenone were placed in a 2-liter beaker and cooled to 0° C. Into this solution, a solution where 20.48 g (0.30 mol) of sodium nitrite is dissolved in 51 mL of ion-exchange water was dropped over 23 minutes while the resulting solution was maintained at a solution temperature between 0° C. or more and 5° C. or less. After dropping, the resulting solution was stirred for 60 minutes and then 3.2 g of activated carbon was added to the resulting solution, which was then stirred for 5 minutes and filtered under suction. While the filtrate obtained was maintained between 0° C. or more and 5° C. or less, a solution where 108.6 g (0.99 mol) of sodium borofluoride was dissolved in 320 mL of ion-exchange water was dropped to the filtrate over 20 minutes under stirring and then further stirred for 60 minutes. The crystals precipitated were filtered under suction. Next, while the filtration residue was maintained between 0° C. or more and 5° C. or less, the filtration residue was dispersed and washed with 1 liter of a 5% aqueous solution of sodium borofluoride for 60 minutes and then filtered under suction. While the filtration residue obtained was maintained between 0° C. or more and 5° C. or less, the filtration residue was dispersed and washed with a mixed solution of 180 mL of acetonitrile and 480 mL of isopropyl ether for 60 minutes, and then filtered under suction. Next, the resulting filtration residue was washed twice with 300 mL of isopropyl ether in a filter and then dried under reduced pressure at room temperature to obtain a fluoborate (1) (amount of yield, 49.5 g; yield rate, 85.5%).

Next, 100 mL of N,N-dimethylformamide was placed in a 300-mL beaker and 2.960 g of the coupler (1) below was dissolved in the solution, which was then cooled to a solution temperature of 0° C.

(1)

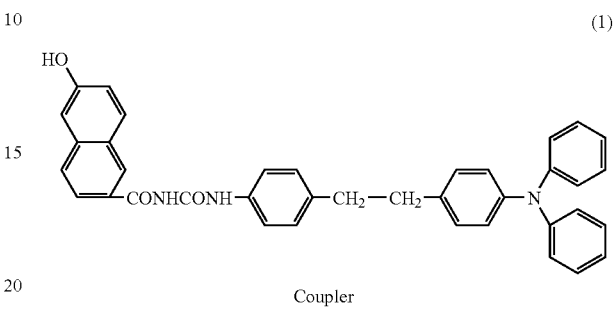

Coupler

Then, 1.00 g of the fluoborate (1) obtained above was added thereto and then 0.567 g of N-methylmorpholine was dropped thereto over 2 minutes.

After that, the resulting mixture was stirred for 2 hours at 0 to 5° C., stirred further for 1.5 hours at room temperature and then filtered under suction. The filtration residue obtained was dispersed and washed with 100 mL of N,N-dimethylformamide for 1.5 hours and filtered. This series of dispersion and washing and filtration was repeated one more time. Next, the resulting filtration residue was dispersed and washed with 200 mL of ion-exchange water for 1.5 hours and filtered. This series of dispersion and washing and filtration was repeated two more times. Then, the resulting filtration residue was freeze-dried to obtain an exemplified compound (1). The amount of yield of the exemplified compound (1) was 2.20 g, the yield rate thereof was 64.9% and the results of mass spectrometry and IR analysis were as follows. Here, the entire production above was performed under yellow light.

Mass Spectrum
Measurement apparatus: Manufacturer, Bruker Corporation; model, Reflex III-TOF
Measurement mode: NEGA
Dispersing solvent: Cyclohexanone
m/z=1,387.9 (M$^-$)
IR Spectrum
Measurement apparatus: Manufacturer, JASCO Corporation; model, FT/IR-420
Measurement method: KBr method
cm$^{-1}$=1696, 1597, 1492, 1272, 1221, 1150, 926 and 754

Synthetic Example 2

Synthesis of Exemplified Compound (2)

1,500 mL of ion-exchange water, 45.6 mL (0.50 mol) of concentrated hydrochloric acid and 18 g (0.062 mol) of 4,4'-diaminobenzoylbiphenyl were placed in a 3-liter beaker and cooled to 0° C. Into this solution, a solution where 9.045 g (0.13 mol) of sodium nitrite was dissolved in 22.5 mL of ion-exchange water was dropped over 26 minutes while the resulting solution was maintained at a solution temperature of −1 to 3° C. After that, the resulting solution was stirred for 60 minutes at a solution temperature of 0 to 5° C., and then 1.5 g of activated carbon was added to the resulting solution, which was then stirred for 5 minutes and filtered under suction.

While this filtrate was maintained at a solution temperature of 0 to 5° C., a solution where 23.993 g (0.22 mol) of sodium borofluoride was dissolved in 80 mL of ion-exchange water was dropped to the filtrate over 17 minutes under stirring and then further stirred for 40 minutes. The crystals precipitated were filtered under suction. Next, while the filtration residue was maintained at a solution temperature of 0 to 5° C., the filtration residue was dispersed and washed for 40 minutes in 600 mL of a 5% aqueous solution of sodium borofluoride and then filtered under suction. Moreover, while the filtrate filtration residue was maintained at a solution temperature of 0 to 5° C., the filtration residue was dispersed and washed for 40 minutes in a mixed solution of 450 mL of acetonitrile and 1,000 mL of isopropyl ether and then filtered under suction. Next, the resulting filtration residue was washed twice in a mixed solution of 200 mL of acetonitrile and 500 mL of isopropyl ether in a filter and then dried under reduced pressure at room temperature to obtain a borofluoride (2) (amount of yield, 22.63 g; yield rate, 74.6%).

Next, 100 mL of N,N-dimethylformamide was placed in a 300-mL beaker and 2.496 g of the coupler (1) above was dissolved in the solution, which was then cooled to a solution temperature of 0° C. Next, 1.00 g of the borofluoride (2) obtained above was added thereto and then 0.478 g of N-methylmorpholine was dropped thereto over 2 minutes.

After that, the resulting mixture was stirred for 2 hours at 0 to 5° C., stirred further for 1.5 hours at room temperature and then filtered under suction. The filtration residue obtained was dispersed and washed with 100 mL of N,N-dimethylformamide for 1.5 hours and filtrated. This series of dispersion and washing and filtration was repeated one more time. Next, the resulting filtration residue was dispersed and washed with 200 mL of ion-exchange water for 1.5 hours and filtrated. This series of dispersion and washing and filtration was repeated two more times. Then, the resulting filtration residue was freeze-dried to obtain an exemplified compound (2). The amount of yield of the exemplified compound (2) was 2.141 g, the yield rate thereof was 71.0% and the results of mass spectrometry and IR analysis were as follows. Here, the entire production above was performed under yellow light.

Mass Spectrum
m/z=1,464.8 (M-)
IR Spectrum
$cm^{-1}$=1697, 1595, 1490, 1271, 927, 824, 752 and 694

Synthetic Example 3

Synthesis of Exemplified Compound (3)

100 mL of N,N-dimethylformamide was placed in a 300-mL beaker and 2.850 g of the coupler (1) above was dissolved in the solution, which was then cooled to a solution temperature of 0° C. Next, 1.00 g of the borofluoride (3) below was added thereto and then 0.546 g of N-methylmorpholine was dropped thereto over 2 minutes.

(3)

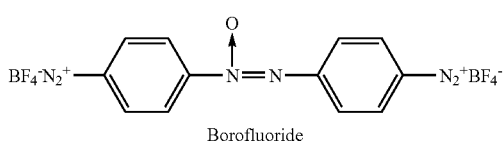

Borofluoride

After that, the resulting solution was stirred for 2 hours at 0 to 5° C., stirred further for 1.5 hours at room temperature and then filtered under suction. The filtration residue obtained was dispersed and washed for 1.5 hours with 100 mL of N,N-dimethylformamide and filtered. This series of dispersion and washing and filtration was repeated one more time. Next, the resulting filtration residue was dispersed and washed with 200 mL of ion-exchange water for 1.5 hours and filtered. This series of dispersion and washing and filtration was repeated two more times. Next, the resulting filtration residue was freeze-dried to obtain an exemplified compound (3). The amount of yield of the exemplified compound (3) was 2.245 g, the yield rate thereof was 68.0% and the results of mass spectrometry and IR analysis were as follows. Here, the entire production above was performed under yellow light.

Mass Spectrum
m/z=1,404.3 (M-)
IR Spectrum
$cm^{-1}$=1694, 1594, 1544, 1490, 1271, 1217, 984, 833 and 752

Synthetic Example 4

Synthesis of Exemplified Compound (4)

100 mL of N,N-dimethylformamide was placed in a 300-mL beaker and 2.698 g of the coupler (1) above was dissolved in the solution, which was then cooled to a solution temperature of 0° C. Next, 1.00 g of the borofluoride (4) below was added thereto and then 0.516 g of N-methylmorpholine was dropped thereto over 2 minutes.

(4)

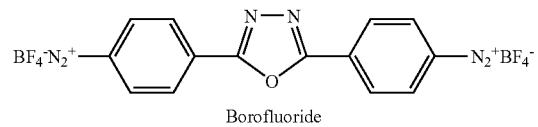

Borofluoride

Next, the resulting solution was stirred for 2 hours at 0 to 5° C., stirred further for 1.5 hours at room temperature and then filtered under suction. The filtration residue obtained was dispersed and washed with 100 mL of N,N-dimethylformamide for 1.5 hours and filtered. This series of dispersion and washing and filtration was repeated one more time. Next, the resulting filtration residue was dispersed and washed in 200 mL of ion-exchange water for 1.5 hours and filtered. This series of dispersion and washing and filtration was repeated two more times. Next, the resulting filtration residue was freeze-dried to obtain an exemplified compound (4). The amount of yield of the exemplified compound (4) was 2.388 g, the yield rate thereof was 75.1% and the results of mass spectrometry and IR analysis were as follows. Here, the entire production above was performed under yellow light.

Mass Spectrum
m/z=1,428.4 (M-)
IR Spectrum
$cm^{-1}$=1696, 1594, 1490, 1215, 753 and 688

Azo pigments other than above can also be synthesized in the same way as the azo pigment above by selecting appropriate raw materials depending on their structures.

Example 1

An aluminum element tube (ED tube) (Showa Denko K.K., Rzjis=0.8 μm) having a diameter of 30 mm and a length of 357.5 mm was used as the support.

Next, the materials below were dispersed for 3 hours with a sand mill apparatus using glass beads having a diameter of 0.8 mm. After dispersion, the glass beads were separated by mesh filtration and the filtrate was diluted with a mixed solution having 1-methoxy-2-propanol:methanol=1:1 so that the solid content was 55% to prepare an electrically conductive layer-forming coating liquid.

| | |
|---|---|
| Electrically conductive titanium oxide particles (coated with tin oxide containing 10% antimony oxide) | 50 parts |
| Resol-type phenolic resin | 25 parts |
| 1-Methoxy-2-propanol | 20 parts |
| Spherical silicone resin powder (trade name, TOSPEARL 120; Momentive Performance Materials Inc. (old corporate name: TOSHIBA Silicone Co., Ltd.)) | 3.8 parts |
| Methanol | 5 parts |
| Silicone oil (polydimethylsiloxane-polyoxyalkylene copolymer; average molecular weight, 3,000) | 0.002 parts |

The support was dip-coated with this electrically conductive layer-forming coating liquid and the coating on the support was dried for 30 minutes at 140° C. to form an electrically conductive layer having a film thickness of 15 μm thereon.

Next, 20 parts of an N-methoxymethylated 6 nylon resin (trade name, Toresin EF-30T; Nagase ChemteX Corporation; rate of methylation, 36.8%) was dissolved in 180 parts of n-butanol under heating at 65° C. Next, the solution obtained by filtration with a membrane filter (FP-022; pore size, 0.22 μm; Sumitomo Electric Industries, Ltd.) was left to stand in an airtight container at 5° C. for 5 days to obtain a gelated polyamide resin. 160 parts of this gelated polyamide resin, 65 parts of ethanol and 5.3 parts of the azo pigment (exemplified compound (1)) obtained in Synthetic Example 1 were dispersed for 5 hours in a sand mill apparatus using glass beads having a diameter of 0.8 mm. After dispersion, the glass beads were separated by mesh filtration, and the filtrate was diluted with a mixed solution having ethanol:n-butanol=4:1 so that the solid content was 3.0% to prepare an intermediate layer-forming coating liquid.

The electrically conductive layer was dip-coated with this intermediate layer-forming coating liquid and the coating on the electrically conductive layer was dried for 10 minutes at 100° C. to form an intermediate layer having a film thickness of 0.58 μm thereon.

Next, the materials below were dispersed for 4 hours in a sand mill apparatus using glass beads having a diameter of 0.8 mm. After dispersion, the glass beads were separated by mesh filtration and the filtrate was diluted with a mixed solution having cyclohexanone:ethyl acetate 1:2 so that the slid content was 1.8% to prepare a charge generation layer-forming coating liquid.

| | |
|---|---|
| Crystalline hydroxygallium phthalocyanine having strong peaks at Bragg angles of 2θ ± 0.2°, namely 7.5°, 9.9°, 16.3°, 18.6°, 25.1° and 28.3°, in CuKα characteristic X-ray diffraction | 21 parts |
| Cyclohexanone solution containing 5% by mass of a polyvinyl butyral resin (trade name, S-LEC BX-1; Sekisui Chemical Co., Ltd.) | 210 parts |

The intermediate layer was dip-coated with this charge generation layer-forming coating liquid and the coating on the intermediate layer was dried for 10 minutes at 100° C. to form a charge generation layer having a film thickness of 0.17 μm thereon.

Next, 8 parts of the charge transport material (A) below

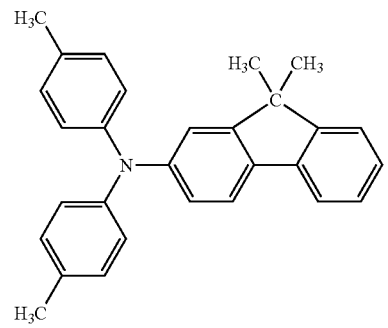

and 10 parts of a polycarbonate resin (trade name, Iupilon Z200; Mitsubishi Engineering-Plastics Corporation) were dissolved in 70 parts of monochlorobenzene to prepare a charge transport layer-forming coating liquid.

The charge generation layer was dip-coated with this charge transport layer-forming coating liquid and the coating on the layer was dried for 60 minutes at 110° C. to form a charge transport layer having a film thickness of 20 μm thereon.

In this way, an electrophotographic photosensitive member was obtained.

The electrophotographic photosensitive member obtained was installed in a modified version of GP-40, a copier from Canon Inc. (a light source as the exposure device was replaced by a 778 nm semiconductor laser having adjustable light intensity; a light source as the pre-exposure device was replaced by a red LED having adjustable light intensity; and a motor was replaced by a motor having adjustable process speed) and its endurance potential variation was evaluated.

In evaluation, a development unit was removed from the main body of the copier above and instead, a potential-measuring probe was fixed at the development location for potential measurement. At this time, no transfer unit was brought into contact with the electrophotographic photosensitive member and no paper sheet was fed.

First, the electrophotographic photosensitive member along with the copier was left for 3 days in the environment: temperature, 23° C.; and humidity, 5% RH. Then, the dark-area potential (VD) was adjusted to −700 V and the light-area potential (VL) was adjusted to −180 V in the same environment. The light intensity of the pre-exposure device was adjusted to three times the light intensity required to reduce a surface potential of −700 V to −180 V. The process speed was adjusted to 320 mm/s.

After that, an endurance test involving 1,000 continuous rotations (full screen black image mode) was conducted. The VD and VL measured at the 1,000th rotation were −698 V and −186 V, respectively. These results were used to calculate a change in VD between the initial and 1,000th rotation, ΔVD1, (initial VD minus 1,000th rotation VD) and a change in VL between the initial and 1,000th rotation, ΔVL1, (initial VL minus 1,000th-rotation VL). In the present Example, the change ΔVD1 is −2 V and the change ΔVL1 was +6 V. Moreover, an endurance test involving 50,000 rotations is also measured similarly, and the VD and VL at the 50,000th rotation were −691 V and −215 V, respectively. These results were used to calculate a change in VD between the initial and 50,000th rotation, ΔVD2 (initial VD minus 50,000th rotation VD) and a change in VL between the initial and 50,000th rotation, ΔVL2, (initial VL minus 50,000th rotation VL). In the present Example, the change ΔVD2 is −9 V and the change in VL, ΔVL2, is +35 V. The results are shown in Table 1.

Examples 2 to 11 and 13 to 17

Electrophotographic photosensitive members were prepared and ΔVD1, ΔVL1, ΔVD2 and ΔVL2 were measured and calculated in the same way as in Example 1 except that the exemplified compound (1) used for the intermediate layer in Example 1 was replaced by each of the exemplified compounds shown in Table 1. The results are shown in Table 1.

Comparative Example 1

An electrophotographic photosensitive member was prepared and ΔVD1, ΔVL1, ΔVD2 and ΔVL2 were measured and calculated in the same way as in Example 1 except that the exemplified compound (1) used for the intermediate layer in Example 1 was not used. The results are shown in Table 1.

Comparative Example 2

An electrophotographic photosensitive member was prepared and ΔVD1, ΔVL1, ΔVD2 and δVL2 were measured and calculated in the same way as in Example 1 except that the exemplified compound (1) used for the intermediate layer in Example 1 was replaced by the comparative exemplified compound (1) below. The results are shown in Table 1.

Comparative exemplified compound (1)

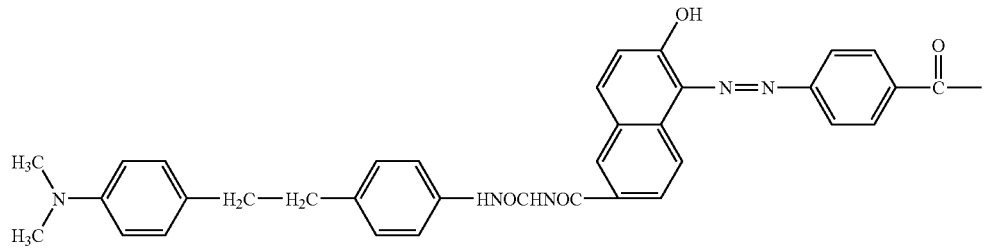

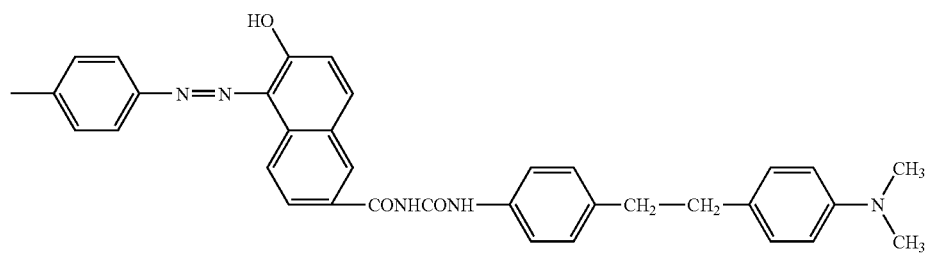

Comparative Example 3

An electrophotographic photosensitive member was prepared and ΔVD1, ΔVL1, ΔVD2 and ΔVL2 were measured and calculated in the same way as in Example 1 except that the exemplified compound (1) used for the intermediate layer in Example 1 was replaced by the comparative exemplified compound (2) below. The results are shown in Table 1.

Comparative exemplified compound (2)

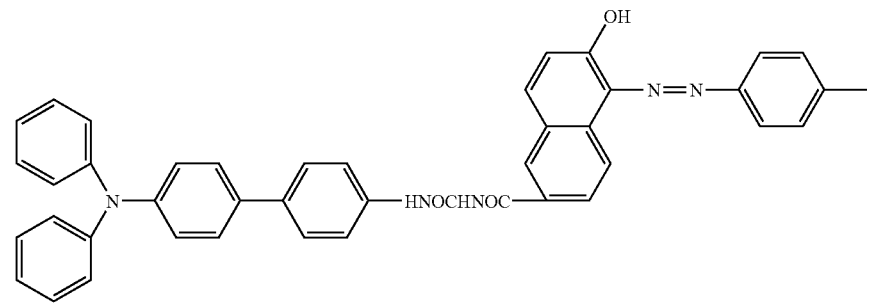

-continued

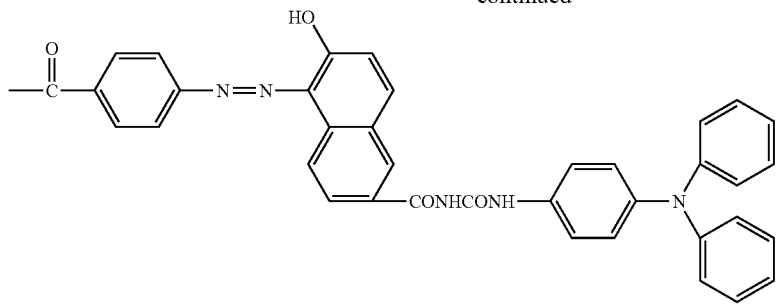

Comparative Example 4

An electrophotographic photosensitive member was prepared and ΔVD1, ΔVL1, ΔVD2 and ΔVL2 were measured and calculated in the same way as in Example 1 except that the exemplified compound (1) used for the intermediate layer in Example 1 was replaced by the comparative exemplified compound (3) below. The results are shown in Table 1.

Comparative exemplified compound (3)

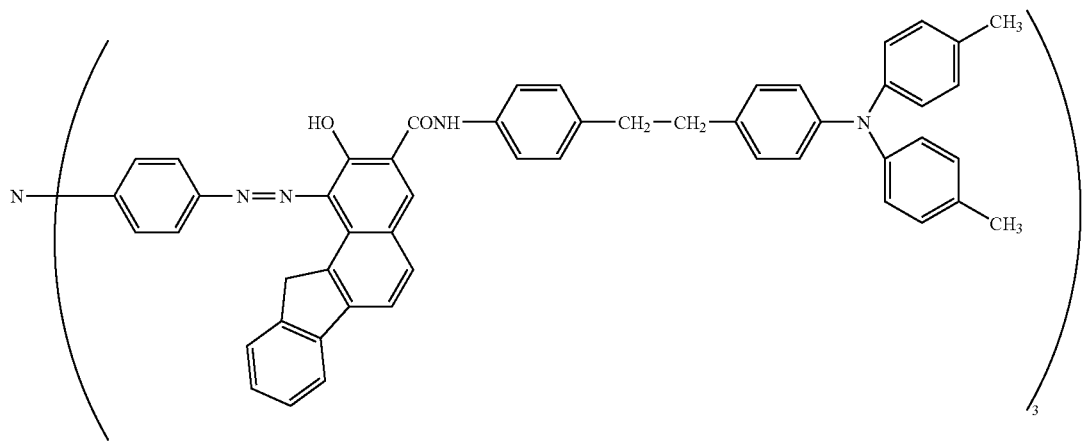

TABLE 1

|  | Pigment | ΔVD1 (V) | ΔVL1 (V) | ΔVD2 (V) | ΔVL2 (V) |
|---|---|---|---|---|---|
| Example 1 | Exemplified compound (1) | −2 | +6 | −9 | +35 |
| Example 2 | Exemplified compound (2) | −1 | +10 | −8 | +38 |
| Example 3 | Exemplified compound (3) | −2 | +12 | −9 | +38 |
| Example 4 | Exemplified compound (4) | −2 | +13 | −9 | +40 |
| Example 5 | Exemplified compound (5) | −2 | +15 | −9 | +42 |
| Example 6 | Exemplified compound (6) | −3 | +17 | −11 | +45 |
| Example 7 | Exemplified compound (7) | −2 | +17 | −9 | +44 |
| Example 8 | Exemplified compound (8) | −2 | +18 | −9 | +44 |
| Example 9 | Exemplified compound (9) | −3 | +20 | −10 | +47 |
| Example 10 | Exemplified compound (10) | −2 | +22 | −9 | +49 |
| Example 11 | Exemplified compound (11) | −3 | +25 | −10 | +52 |
| Example 13 | Exemplified compound (13) | −4 | +25 | −11 | +51 |
| Example 14 | Exemplified compound (14) | −3 | +25 | −9 | +50 |
| Example 15 | Exemplified compound (15) | −3 | +30 | −10 | +56 |
| Example 16 | Exemplified compound (16) | −2 | +32 | −9 | +58 |
| Example 17 | Exemplified compound (17) | −2 | +33 | −10 | +58 |
| Comparative Example 1 | No | −4 | +55 | −11 | +65 |

TABLE 1-continued

| | Pigment | ΔVD1 (V) | ΔVL1 (V) | ΔVD2 (V) | ΔVL2 (V) |
|---|---|---|---|---|---|
| Comparative Example 2 | Comparative exemplified compound (1) | −4 | +40 | −12 | +63 |
| Comparative Example 3 | Comparative exemplified compound (2) | −4 | +42 | −13 | +63 |
| Comparative Example 4 | Comparative exemplified compound (3) | −5 | +45 | −12 | +64 |

The results shown in Table 1 show that when the intermediate layer contains an azo pigment of the present invention, both initial (up to 1,000 rotations) potential variation and long-term (up to 50,000 rotations) potential variation are reduced in a low-humidity environment.

Example 18

An aluminum element tube (ED tube) (Showa Denko K. K.; Rzjis=0.8 μm) having a diameter of 30 mm and a length of 370 mm that was liquid-honed was used as the support (Rzjis=1.5 μm).

Next, 5 parts of a 6-66-610-12 quaternary polyamide copolymer was dissolved in a mixed solvent of 70 parts of methanol and 25 parts of butanol to prepare an intermediate layer-forming coating liquid.

The support was dip-coated with this intermediate layer-forming coating liquid and the coating on the support was dried for 10 minutes at 100° C. to form an intermediate layer having a film thickness of 0.6 μm thereon.

Next, the materials below were dispersed for 2 hours in a sand mill apparatus using glass beads having a diameter of 0.8 mm. After dispersion, the mixture was diluted with 160 parts of cyclohexanone and 160 parts of methyl ethyl ketone to prepare a charge generation layer-forming coating liquid.

| | |
|---|---|
| Azo pigment obtained in Synthetic Example 1 (exemplified compound (1)) | 10 parts |
| cyclohexanone | 215 parts |
| Solution where 5 parts of vinyl acetate-vinyl alcohol-vinyl benzal copolymer (degree of benzalation, 80 mol %; weight-average molecular weight, 83,000) was dissolved in 45 parts of cyclohexanone | 50 parts |

The intermediate layer was dip-coated with this charge generation layer-forming coating liquid and the coating on the intermediate layer was dried for 10 minutes at 80° C. to form a charge generation layer having a film thickness of 0.25 μm thereon.

Next, 10 parts of the charge transport material (A) mentioned above and 10 parts of a polycarbonate resin (trade name, Iupilon Z-400; Mitsubishi Engineering-Plastics Corporation) were dissolved in 70 parts of monochlorobenzene to prepare a charge transport layer-forming coating liquid.

The charge generation layer was dip-coated with this charge transport layer-forming coating liquid and the coating on the charge generation layer was dried for 30 minutes at 100° C. to form a charge transport layer having a thickness of 20 μm thereon.

In this way, an electrophotographic photosensitive member was obtained.

Gears and flanges were attached to the electrophotographic photosensitive member obtained, which was then installed in a black-and-white copier (trade name, GP-215; Canon Inc.).

The laser exposure optical system as the exposure device was equipped with a GaN-based chip having an oscillation wavelength of 470 nm and an output power of 5 mW, and modified so that the beam spot size was 34 μm. The light intensity required to change the dark-area potential (VD) −700 V to the light-area potential (VL) −200 V was defined as the sensitivity at Δ500 (V·cm²/μJ) in an environment: temperature, 23° C.; and humidity, 55% RH. The results are shown in Table 2.

Examples 19 to 21

Electrophotographic photosensitive members were prepared and the sensitivity at Δ500 (V·cm²/μJ) was measured in the same way as in Example 18 except that the exemplified compound (1) used for the charge generation layer in Example 18 was replaced by each of the exemplified compounds shown in Table 2. The results are shown in Table 2.

Comparative Examples 5 to 7

Electrophotographic photosensitive members were prepared and the sensitivity at Δ500 (V·cm²/μJ) was measured in the same way as in Example 18 except that the exemplified compound (1) used for the charge generation layer in Example 18 was replaced by each of the comparative exemplified compounds shown in Table 2. The results are shown in Table 2.

TABLE 2

| | Pigment | Δ500 (V·cm²/μJ) |
|---|---|---|
| Example 18 | Exemplified compound (1) | 440 |
| Example 19 | Exemplified compound (2) | 420 |
| Example 20 | Exemplified compound (3) | 400 |
| Example 21 | Exemplified compound (4) | 400 |
| Comparative Example 5 | Comparative exemplified compound (1) | 150 |
| Comparative Example 6 | Comparative exemplified compound (2) | 200 |
| Comparative Example 7 | Comparative exemplified compound (3) | 50 |

The results shown in Table 2 show that when the charge generation layer contains an azo pigment of the present invention, a highly sensitive electrophotographic photosensitive member can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-246337, filed Sep. 25, 2008, which is hereby incorporated by reference herein in its entirety.

What is claimed is:

1. An azo pigment comprising a group represented by the formula (1) below:

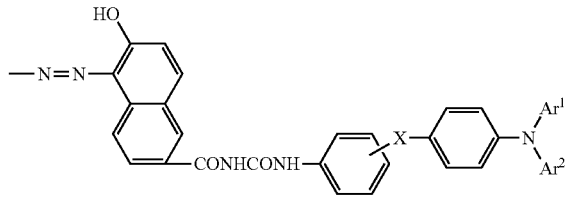

formula (1)

wherein Ar$^1$ and Ar$^2$ each independently represent a substituted or unsubstituted aryl group; and X represents —CH$_2$—, —CH$_2$—CH$_2$—, —CH$_2$—CH$_2$—CH$_2$— or —CH=CH—.

2. The azo pigment according to claim 1, wherein the Ar$^1$ is a substituted or unsubstituted phenyl group; the Ar$^2$ is a substituted or unsubstituted phenyl group; and the X is —CH$_2$—CH$_2$—.

3. The azo pigment according to claim 1 which is represented by the formula (2) below:

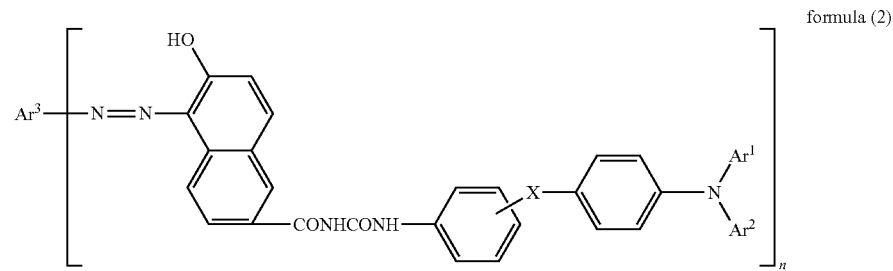

formula (2)

wherein, Ar$^1$ and Ar$^2$ each independently represent a substituted or unsubstituted aryl group; X represents —CH$_2$—, —CH$_2$—CH$_2$—, —CH$_2$—CH$_2$—CH$_2$— or —CH=CH—; n represents 1, 2, 3 or 4; and Ar$^3$ represents a group having a valence of n comprising an aromatic hydrocarbon ring or an aromatic heterocycle.

4. The azo pigment according to claim 3, wherein the Ar$^1$ is a substituted or unsubstituted phenyl group; the Ar$^2$ is a substituted or unsubstituted phenyl group; and the X is —CH$_2$—CH$_2$—.

5. The azo pigment according to claim 1 which is represented by the formula (3):

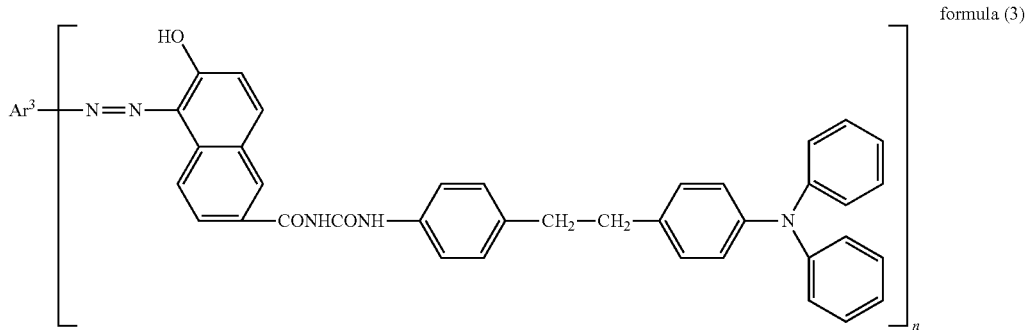

formula (3)

wherein, n represents 1, 2, 3 or 4 and $Ar^3$ represents a group having a valence of n comprising an aromatic hydrocarbon ring or an aromatic heterocycle.

6. The azo pigment according to claim 3, wherein the $Ar^3$ is a group represented by any one selected from the group consisting of the structural formulas (4) to (7) below:

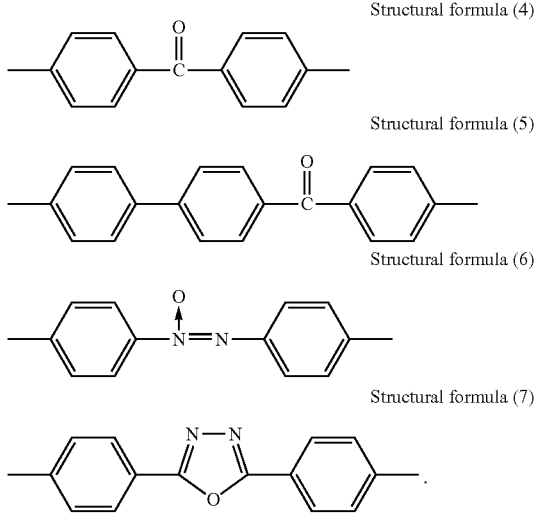

Structural formula (4)

Structural formula (5)

Structural formula (6)

Structural formula (7)

7. An electrophotographic photosensitive member comprising a support, an intermediate layer provided on the support and a photosensitive layer provided on the intermediate layer, wherein the intermediate layer comprises an azo pigment according to claim 1.

8. A process cartridge that integrally supports an electrophotographic photosensitive member according to claim 7 and at least one device selected from the group consisting of a charging device, a developing device, a transfer device and a cleaning device and that can be detachably attached to the main body of an electrophotographic apparatus.

9. An electrophotographic apparatus comprising an electrophotographic photosensitive member according to claim 7, a charging device, an exposure device, a developing device and a transfer device.

10. The azo pigment according to claim 1, wherein $Ar^1$ and $Ar^2$ each independently represent the substituted or unsubstituted aryl group, wherein the substituent is selected from the group consisting of alkyl groups, alkoxy groups, halogen atoms, dialkylamino groups, a hydroxy group, a nitro group, a cyano group, an acetyl group, a halomethyl group and a halomethoxy group.

11. The azo pigment according to claim 1, wherein $Ar^1$ and $Ar^2$ is each independently an aryl group, or an aryl group substituted with a methyl group.

* * * * *